US012709693B2

United States Patent
Yamada et al.

(10) Patent No.: US 12,709,693 B2
(45) Date of Patent: Aug. 18, 2026

(54) SET AND INK JET RECORDING METHOD

(71) Applicant: SEIKO EPSON CORPORATION, Tokyo (JP)

(72) Inventors: Akiko Yamada, Shiojiri (JP); Ryota Miyasa, Matsumoto (JP); Tasuku Nakamura, Matsumoto (JP)

(73) Assignee: SEIKO EPSON CORPORATION (JP)

(*) Notice: Subject to any disclaimer, the term of this patent is extended or adjusted under 35 U.S.C. 154(b) by 127 days.

(21) Appl. No.: 18/678,340

(22) Filed: May 30, 2024

(65) Prior Publication Data

US 2024/0400849 A1 Dec. 5, 2024

(30) Foreign Application Priority Data

Jun. 2, 2023 (JP) ................................ 2023-091424

(51) Int. Cl.
*C09D 11/40* (2014.01)
*B41J 2/01* (2006.01)
(Continued)

(52) U.S. Cl.
CPC ................ *C09D 11/40* (2013.01); *B41J 2/01* (2013.01); *B41J 2/2107* (2013.01); *B41J 2/2114* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598;
(Continued)

(56) References Cited

U.S. PATENT DOCUMENTS

2004/0092621 A1* 5/2004 Kataoka ................ C09D 11/30 523/160
2007/0076069 A1* 4/2007 Edwards ............. B41M 5/0023 347/100

(Continued)

FOREIGN PATENT DOCUMENTS

JP 2021-102337 A 7/2021

*Primary Examiner* — Manish S Shah
(74) *Attorney, Agent, or Firm* — Harness, Dickey & Pierce, P.L.C.

(57) ABSTRACT

A set according to an embodiment of the present disclosure includes a treatment solution composition that contains particles containing organopolysiloxane, and water, an ink jet ink composition that contains a pigment and water, and a reaction solution that contains an aggregating agent causing aggregation of a component of the ink jet ink composition, and water. A relation between a static surface tension (mN/m) of the reaction solution, a static surface tension (mN/m) of the ink jet ink composition, and a static surface tension (mN/m) of the treatment solution composition satisfies (the static surface tension of the reaction solution)<(the static surface tension of the ink jet ink composition)≤(the static surface tension of the treatment solution composition). The static surface tension of the reaction solution is from 25 to 40 mN/m. The treatment solution composition, the ink jet ink composition, and the reaction solution are discharged by an ink jet method and used.

13 Claims, 5 Drawing Sheets

(51) Int. Cl.

| | |
|---|---|
| ***B41J 2/21*** | (2006.01) |
| ***C09D 11/033*** | (2014.01) |
| ***C09D 11/102*** | (2014.01) |
| ***C09D 11/322*** | (2014.01) |
| ***C09D 11/38*** | (2014.01) |
| ***C09D 11/54*** | (2014.01) |
| ***D06P 1/52*** | (2006.01) |
| ***D06P 5/30*** | (2006.01) |

(52) U.S. Cl.

CPC .......... *C09D 11/033* (2013.01); *C09D 11/102* (2013.01); *C09D 11/322* (2013.01); *C09D 11/38* (2013.01); *C09D 11/54* (2013.01); *D06P 1/5292* (2013.01); *D06P 5/30* (2013.01)

(58) Field of Classification Search

CPC ................ B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 2009/0153613 | A1* | 6/2009 | Yamanobe | B41M 5/0017 347/21 |
| 2013/0176369 | A1* | 7/2013 | Gotou | B41M 5/0023 347/100 |
| 2013/0278660 | A1* | 10/2013 | Tsuji | B41J 2/2132 347/14 |
| 2015/0197654 | A1* | 7/2015 | Okuda | C09D 11/54 524/88 |
| 2015/0275014 | A1* | 10/2015 | Yamazaki | C09D 11/322 347/20 |
| 2017/0292035 | A1* | 10/2017 | Saito | D06P 1/5285 |
| 2018/0030292 | A1* | 2/2018 | Gotou | C09D 11/033 |
| 2019/0264057 | A1* | 8/2019 | Ohta | C09D 11/40 |
| 2019/0283464 | A1* | 9/2019 | Matsuzaki | C09D 11/38 |
| 2020/0165474 | A1* | 5/2020 | Nakamura | C08L 69/00 |
| 2020/0262228 | A1* | 8/2020 | Hagiwara | C09D 11/38 |
| 2021/0198509 | A1 | 7/2021 | Sekiguchi et al. | |
| 2021/0301167 | A1* | 9/2021 | Okada | C09D 11/102 |
| 2022/0064472 | A1* | 3/2022 | Asakawa | B41J 2/2114 |
| 2022/0154396 | A1* | 5/2022 | Oriakhi | D06P 5/30 |
| 2022/0325122 | A1* | 10/2022 | Asakawa | B41M 5/0011 |
| 2023/0347675 | A1* | 11/2023 | Yamada | D06P 5/30 |
| 2024/0117210 | A1* | 4/2024 | Makimoto | B41M 5/0047 |
| 2024/0376333 | A1* | 11/2024 | Morozumi | C09D 11/40 |
| 2024/0401268 | A1* | 12/2024 | Miyasa | D06P 1/5257 |
| 2025/0121611 | A1* | 4/2025 | Aoki | B41J 2/155 |

* cited by examiner

FIG. 4

TABLE 1:

| CONDITION | | | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|---|---|
| INK COMPOSITION ACTIVE INGREDIENT/% | PIGMENT | CARBON BLACK | 5.0 | 5.0 | 5.0 | 5.0 | 5.0 | 5.0 | 5.0 | 5.0 | 5.0 |
| | RESIN | TAKELAC WS-5100 MITSUI CHEMICALS INC. | 6.0 | 6.0 | 6.0 | 6.0 | 6.0 | 6.0 | 6.0 | 6.0 | 6.0 |
| | ORGANIC SOLVENT | GLYCERIN | 14 | 14 | 14 | 14 | 14 | 14 | 14 | 14 | 14 |
| | | TRIETHYLENE GLYCOL | 4.5 | 4.5 | 4.5 | 4.5 | 4.5 | 4.5 | 4.5 | 4.5 | 4.5 |
| | | TRIETHYLENE GLYCOL MONOBUTYL ETHER | 1 | 1 | 1 | 1 | 1 | 1 | 1 | 1 | 1 |
| | SURFACTANT | E1010 NISSIN CHEMICAL CO., LTD. | 0.5 | 0.5 | - | - | - | 0.5 | 0.5 | 0.5 | 0.5 |
| | | BYK348 BYK ADDITIVES & INSTRUMENTS. | - | - | 0.5 | 0.5 | - | - | - | - | - |
| | | E1020 NISSIN CHEMICAL CO., LTD. | - | - | - | - | 0.5 | - | - | - | - |
| | OTHERS | TRIETHANOLAMINE | 1 | 1 | 1 | 1 | 1 | 1 | 1 | 1 | 1 |
| | | ION EXCHANGE WATER | REMAINING AMOUNT | REMAINING AMOUNT | REMAINING AMOUNT | REMAINING AMOUNT | REMAINING AMOUNT | REMAINING AMOUNT | REMAINING AMOUNT | REMAINING AMOUNT | REMAINING AMOUNT |
| REACTION SOLUTION COMPOSITION ACTIVE INGREDIENT/% | POLYVALENT METAL SALT | MAGNESIUM SULFATE HEPTAHYDRATE | 5 | 5 | 5 | 5 | 5 | - | - | - | 5 |
| | | CALCIUM SULFATE DIHYDRATE | - | - | - | - | - | 5 | - | - | - |
| | CATIONIC POLYMER | FPA-100L (SENKA CORPORATION) | - | - | - | - | - | - | 5 | - | - |
| | ACID | DL-LACTIC ACID | - | - | - | - | - | - | - | 5 | - |
| | ORGANIC SOLVENT | GLYCERIN | 16 | 16 | 16 | 16 | 16 | 16 | 16 | 16 | 16 |
| | | TRIETHYLENE GLYCOL | 16 | 16 | 16 | 16 | 16 | 16 | 16 | 16 | 16 |
| | SURFACTANT | E1010 NISSIN CHEMICAL CO., LTD. HLB VALUE FROM 13 TO 14 | 1 | - | - | - | 0.5 | 1 | 1 | 1 | 1 |
| | | BYK348 BYK ADDITIVES & INSTRUMENTS. HLB VALUE 11 | - | 1 | 1 | 1 | - | - | - | - | - |
| | | SURFLON S-242 AGC SEIMI CHEMICAL CO., LTD. HLB VALUE 12 | - | - | - | - | - | - | - | - | - |
| | | E1004 NISSIN CHEMICAL CO., LTD. HLB VALUE 9 | - | - | - | - | - | - | - | - | - |
| | OTHERS | ION EXCHANGE WATER | REMAINING AMOUNT | REMAINING AMOUNT | REMAINING AMOUNT | REMAINING AMOUNT | REMAINING AMOUNT | REMAINING AMOUNT | REMAINING AMOUNT | REMAINING AMOUNT | REMAINING AMOUNT |
| TREATMENT SOLUTION COMPOSITION ACTIVE INGREDIENT/% | POLYSILOXANE | DIMETHYL SILICONE OIL (SHIN-ETSU CHEMICAL CO., LTD., KF-96H-10000cs) | 7 | 7 | 7 | 7 | 7 | 7 | 7 | 7 | - |
| | | AMINO-MODIFIED SILICONE OIL (SHIN-ETSU CHEMICAL CO., LTD., KF-868) | - | - | - | - | - | - | - | - | 7 |
| | EMULSIFIER | POLYOXYETHYLENE TRIDECYL ETHER (NIPPON NYUKAZAI CO., LTD., NEWCOL1310) | 0.5 | 0.5 | 0.5 | 0.5 | 0.5 | 0.5 | 0.5 | 0.5 | 0.5 |
| | | POLYOXYETHYLENE TRIDECYL ETHER (NIPPON NYUKAZAI CO., LTD., NEWCOL1305) | 0.5 | 0.5 | 0.5 | 0.5 | 0.5 | 0.5 | 0.5 | 0.5 | 0.5 |
| | SURFACTANT | E1004 NISSIN CHEMICAL CO., LTD. | 0.2 | 0.2 | 0.2 | - | - | 0.2 | 0.2 | 0.2 | 0.2 |
| | | BYK348 BYK ADDITIVES | - | - | - | 0.2 | - | - | - | - | - |
| | ORGANIC SOLVENT | DIETHYLENE GLYCOL MONOBUTYL ETHER SP VALUE 10.0 | 1 | 1 | 1 | 1 | 1 | 1 | 1 | 1 | 1 |
| | | 1,2-HEXANEDIOL SP VALUE 12.2 | - | - | - | - | - | - | - | - | - |
| | | GLYCERIN SP VALUE 16.7 | 20 | 20 | 20 | 20 | 20 | 20 | 20 | 20 | 20 |
| | OTHERS | ION EXCHANGE WATER | REMAINING AMOUNT | REMAINING AMOUNT | REMAINING AMOUNT | REMAINING AMOUNT | REMAINING AMOUNT | REMAINING AMOUNT | REMAINING AMOUNT | REMAINING AMOUNT | REMAINING AMOUNT |
| SURFACE TENSION | MEASUREMENT VALUE [mN/m] | INK | 32 | 32 | 27 | 27 | 37 | 32 | 32 | 32 | 32 |
| | | REACTION SOLUTION | 30 | 25 | 25 | 25 | 36 | 30 | 30 | 30 | 30 |
| | | TREATMENT SOLUTION | 33 | 33 | 33 | 28 | 38 | 33 | 33 | 33 | 34 |
| | SEQUENCE | WHETHER SURFACE TENSION OF REACTION SOLUTION IS FROM 25 TO 40 [mN/m] OR NOT | ○ | ○ | ○ | ○ | ○ | ○ | ○ | ○ | ○ |
| | | WHETHER REACTION SOLUTION <INK≤TREATMENT SOLUTION OR NOT | ○ | ○ | ○ | ○ | ○ | ○ | ○ | ○ | ○ |
| VISCOSITY | [mPa·s] | INK VISCOSITY | 4.7 | 4.7 | 4.7 | 4.7 | 4.7 | 4.7 | 4.7 | 4.7 | 4.7 |
| EVALUATION RESULT | PRINTING PROPERTIES | COLOR DEVELOPABILITY | AAA | AA | A | B | AAA | AAA | B | B | AA |
| | | BLEEDING | A | A | B | B | A | A | B | B | A |
| | | GRAININESS | A | A | A | A | B | B | A | A | A |
| | | YELLOWING | A | A | A | A | A | A | A | A | B |
| | | DISCHARGE STABILITY (INK) | A | A | A | A | A | A | A | A | A |
| | | DISCHARGE STABILITY (TREATMENT SOLUTION) | A | A | A | A | A | A | A | A | A |
| | | SURFACE TENSION STABILITY (REACTION SOLUTION) | A | A | A | A | A | A | A | A | A |

FIG. 5

TABLE 2:

| CONDITION | | | EXAMPLE 10 | EXAMPLE 11 | EXAMPLE 12 | EXAMPLE 13 | EXAMPLE 14 | EXAMPLE 15 | EXAMPLE 16 | EXAMPLE 17 | EXAMPLE 18 |
|---|---|---|---|---|---|---|---|---|---|---|---|
| INK COMPOSITION ACTIVE INGREDIENT/% | PIGMENT | CARBON BLACK | 5.0 | 5.0 | 5.0 | 5.0 | 5.0 | 5.0 | 5.0 | 5.0 | 5.0 |
| | RESIN | TAKELAC WS-5100 MITSUI CHEMICALS INC. | 6.0 | 6.0 | 6.0 | 6.0 | 6.0 | 6.0 | 6.0 | 6.0 | 6.0 |
| | ORGANIC SOLVENT | GLYCERIN | 8 | 20 | 26 | 14 | 14 | 14 | 14 | 14 | 14 |
| | | TRIETHYLENE GLYCOL | 4.5 | 4.5 | 4.5 | 4.5 | 4.5 | 4.5 | 4.5 | 4.5 | 4.5 |
| | | TRIETHYLENE GLYCOL MONOBUTYL ETHER | 1 | 1 | 1 | 1 | 1 | 1 | 1 | 1 | 1 |
| | SURFACTANT | E1010 NISSIN CHEMICAL CO., LTD. | 0.5 | 0.5 | 0.5 | 0.5 | 0.5 | 0.5 | 0.5 | 0.5 | 0.5 |
| | | BYK348 BYK ADDITIVES & INSTRUMENTS. | - | - | - | - | - | - | - | - | - |
| | | E1020 NISSIN CHEMICAL CO., LTD. | - | - | - | - | - | - | - | - | - |
| | OTHERS | TRIETHANOLAMINE | 1 | 1 | 1 | 1 | 1 | 1 | 1 | 1 | 1 |
| | | ION EXCHANGE WATER | REMAINING AMOUNT | REMAINING AMOUNT | REMAINING AMOUNT | REMAINING AMOUNT | REMAINING AMOUNT | REMAINING AMOUNT | REMAINING AMOUNT | REMAINING AMOUNT | REMAINING AMOUNT |
| REACTION SOLUTION COMPOSITION ACTIVE INGREDIENT/% | POLYVALENT METAL SALT | MAGNESIUM SULFATE HEPTAHYDRATE | 5 | 5 | 5 | 0.5 | 10 | 5 | 5 | 5 | 5 |
| | | CALCIUM SULFATE DIHYDRATE | - | - | - | - | - | - | - | - | - |
| | CATIONIC POLYMER | FPA-100L (SENKA CORPORATION) | - | - | - | - | - | - | - | - | - |
| | ACID | DL-LACTIC ACID | - | - | - | - | - | - | - | - | - |
| | ORGANIC SOLVENT | GLYCERIN | 16 | 16 | 16 | 16 | 16 | 16 | 16 | 16 | 16 |
| | | TRIETHYLENE GLYCOL | 16 | 16 | 16 | 16 | 16 | 16 | 16 | 16 | 16 |
| | SURFACTANT | E1010 NISSIN CHEMICAL CO., LTD. HLB VALUE FROM 13 TO 14 | 1 | 1 | 1 | 1 | 1 | 1 | 1 | - | 1 |
| | | BYK348 BYK ADDITIVES & INSTRUMENTS. HLB VALUE 11 | - | - | - | - | - | - | - | - | - |
| | | SURFLON S-242 AGC SEIMI CHEMICAL CO., LTD. HLB VALUE 12 | - | - | - | - | - | - | - | - | - |
| | | E1004 NISSIN CHEMICAL CO., LTD. HLB VALUE 9 | - | - | - | - | - | - | - | 0.5 | - |
| | OTHERS | ION EXCHANGE WATER | REMAINING AMOUNT | REMAINING AMOUNT | REMAINING AMOUNT | REMAINING AMOUNT | REMAINING AMOUNT | REMAINING AMOUNT | REMAINING AMOUNT | REMAINING AMOUNT | REMAINING AMOUNT |
| TREATMENT SOLUTION COMPOSITION ACTIVE INGREDIENT/% | POLYSILOXANE | DIMETHYL SILICONE OIL (SHIN-ETSU CHEMICAL CO., LTD., KF-96H-10000cs) | 7 | 7 | 7 | 7 | 7 | 3 | 22 | 7 | 7 |
| | | AMINO-MODIFIED SILICONE OIL (SHIN-ETSU CHEMICAL CO., LTD., KF-868) | - | - | - | - | - | - | - | - | - |
| | EMULSIFIER | POLYOXYETHYLENE TRIDECYL ETHER (NIPPON NYUKAZAI CO., LTD., NEWCOL1310) | 0.5 | 0.5 | 0.5 | 0.5 | 0.5 | 0.2 | 1 | 0.5 | 0.5 |
| | | POLYOXYETHYLENE TRIDECYL ETHER (NIPPON NYUKAZAI CO., LTD., NEWCOL1305) | 0.5 | 0.5 | 0.5 | 0.5 | 0.5 | 0.2 | 1 | 0.5 | 0.5 |
| | SURFACTANT | E1004 NISSIN CHEMICAL CO., LTD. | 0.2 | 0.2 | 0.2 | 0.2 | 0.2 | 0.5 | 0.2 | 0.2 | 0.2 |
| | | BYK348 BYK ADDITIVES | - | - | - | - | - | - | - | - | - |
| | ORGANIC SOLVENT | DIETHYLENE GLYCOL MONOBUTYL ETHER SP VALUE 10.0 | 1 | 1 | 1 | 1 | 1 | 1 | 1 | 1 | - |
| | | 1,2-HEXANEDIOL SP VALUE 12.2 | - | - | - | - | - | - | - | - | 1 |
| | | GLYCERIN SP VALUE 16.7 | 20 | 20 | 20 | 20 | 20 | 24 | 16 | 20 | 20 |
| | OTHERS | ION EXCHANGE WATER | REMAINING AMOUNT | REMAINING AMOUNT | REMAINING AMOUNT | REMAINING AMOUNT | REMAINING AMOUNT | REMAINING AMOUNT | REMAINING AMOUNT | REMAINING AMOUNT | REMAINING AMOUNT |
| SURFACE TENSION | MEASUREMENT VALUE [mN/m] | INK | 32 | 32 | 32 | 32 | 32 | 32 | 32 | 32 | 32 |
| | | REACTION SOLUTION | 30 | 30 | 30 | 30 | 30 | 30 | 30 | 30 | 30 |
| | | TREATMENT SOLUTION | 33 | 33 | 33 | 33 | 33 | 33 | 33 | 33 | 33 |
| | SEQUENCE | WHETHER SURFACE TENSION OF REACTION SOLUTION IS FROM 25 TO 40 [mN/m] OR NOT | ○ | ○ | ○ | ○ | ○ | ○ | ○ | ○ | ○ |
| | | WHETHER REACTION SOLUTION <INK≤TREATMENT SOLUTION OR NOT | ○ | ○ | ○ | ○ | ○ | ○ | ○ | ○ | ○ |
| VISCOSITY | [mPa·s] | INK VISCOSITY | 2.5 | 8.0 | 12.0 | 4.7 | 4.7 | 4.7 | 4.7 | 4.7 | 4.7 |
| EVALUATION RESULT | PRINTING PROPERTIES | COLOR DEVELOPABILITY | A | AAA | AAA | A | AAA | A | AAA | AAA | AAA |
| | | BLEEDING | B | A | A | B | A | A | B | A | A |
| | | GRAININESS | A | B | B | A | B | A | A | A | A |
| | | YELLOWING | A | A | A | A | A | A | A | A | A |
| | | DISCHARGE STABILITY (INK) | A | B | C | A | A | A | A | A | A |
| | | DISCHARGE STABILITY (TREATMENT SOLUTION) | A | A | A | A | A | A | B | A | A |
| | | SURFACE TENSION STABILITY (REACTION SOLUTION) | A | A | A | A | A | A | A | B | A |

FIG. 6

TABLE 3:

| CONDITION | | | EXAMPLE 19 | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 | COMPARATIVE EXAMPLE 7 |
|---|---|---|---|---|---|---|---|---|---|---|
| INK COMPOSITION ACTIVE INGREDIENT/% | PIGMENT | CARBON BLACK | 5.0 | 5.0 | 5.0 | 5.0 | 5.0 | 5.0 | 5.0 | 5.0 |
| | RESIN | TAKELAC WS-5100 MITSUI CHEMICALS INC. | 6.0 | 6.0 | 6.0 | 6.0 | 6.0 | 6.0 | 6.0 | 6.0 |
| | ORGANIC SOLVENT | GLYCERIN | 14 | 14 | 14 | 14 | 14 | 14 | 14 | 14 |
| | | TRIETHYLENE GLYCOL | 4.5 | 4.5 | 4.5 | 4.5 | 4.5 | 4.5 | 4.5 | 4.5 |
| | | TRIETHYLENE GLYCOL MONOBUTYL ETHER | 1 | 1 | 1 | 1 | 1 | 1 | 1 | 1 |
| | SURFACTANT | E1010 NISSIN CHEMICAL CO., LTD. | 0.5 | 0.5 | 0.5 | - | - | - | - | - |
| | | BYK348 BYK ADDITIVES & INSTRUMENTS. | - | - | - | 0.5 | 0.5 | 0.5 | 0.5 | 0.5 |
| | | E1020 NISSIN CHEMICAL CO., LTD. | - | - | - | - | - | - | - | - |
| | OTHERS | TRIETHANOLAMINE | 1 | 1 | 1 | 1 | 1 | 1 | 1 | 1 |
| | | ION EXCHANGE WATER | REMAINING AMOUNT | REMAINING AMOUNT | REMAINING AMOUNT | REMAINING AMOUNT | REMAINING AMOUNT | REMAINING AMOUNT | REMAINING AMOUNT | REMAINING AMOUNT |
| REACTION SOLUTION COMPOSITION ACTIVE INGREDIENT/% | POLYVALENT METAL SALT | MAGNESIUM SULFATE HEPTAHYDRATE | 5 | 5 | 5 | 5 | 5 | 5 | 5 | NO APPLICATION |
| | | CALCIUM SULFATE DIHYDRATE | - | - | - | - | - | - | - | |
| | CATIONIC POLYMER | FPA-100L (SENKA CORPORATION) | - | - | - | - | - | - | - | |
| | ACID | DL-LACTIC ACID | - | - | - | - | - | - | - | |
| | ORGANIC SOLVENT | GLYCERIN | 16 | 16 | 16 | 16 | 16 | 16 | 16 | |
| | | TRIETHYLENE GLYCOL | 16 | 16 | 16 | 16 | 16 | 16 | 16 | |
| | SURFACTANT | E1010 NISSIN CHEMICAL CO., LTD. HLB VALUE FROM 13 TO 14 | 1 | 0.5 | 1 | 1 | - | 0.2 | 1 | |
| | | BYK348 BYK ADDITIVES & INSTRUMENTS. HLB VALUE 11 | - | - | - | - | - | - | - | |
| | | SURFLON S-242 AGC SEIMI CHEMICAL CO., LTD. HLB VALUE 12 | - | - | - | - | 1 | - | - | |
| | | E1004 NISSIN CHEMICAL CO., LTD. HLB VALUE 9 | - | - | - | - | - | - | - | |
| | OTHERS | ION EXCHANGE WATER | REMAINING AMOUNT | REMAINING AMOUNT | REMAINING AMOUNT | REMAINING AMOUNT | REMAINING AMOUNT | REMAINING AMOUNT | REMAINING AMOUNT | |
| TREATMENT SOLUTION COMPOSITION ACTIVE INGREDIENT/% | POLYSILOXANE | DIMETHYL SILICONE OIL (SHIN-ETSU CHEMICAL CO., LTD., KF-96H-10000cs) | 7 | 7 | 7 | 7 | 7 | 7 | NO APPLICATION | 7 |
| | | AMINO-MODIFIED SILICONE OIL (SHIN-ETSU CHEMICAL CO., LTD., KF-868) | - | - | - | - | - | - | | - |
| | EMULSIFIER | POLYOXYETHYLENE TRIDECYL ETHER (NIPPON NYUKAZAI CO., LTD., NEWCOL1310) | 0.5 | 0.5 | 0.5 | 0.5 | 0.5 | 0.5 | | 0.5 |
| | | POLYOXYETHYLENE TRIDECYL ETHER (NIPPON NYUKAZAI CO., LTD., NEWCOL1305) | 0.5 | 0.5 | 0.5 | 0.5 | 0.5 | 0.5 | | 0.5 |
| | SURFACTANT | E1004 NISSIN CHEMICAL CO., LTD. | 0.2 | 0.2 | - | 0.2 | 0.2 | 0.2 | | 0.2 |
| | | BYK348 BYK ADDITIVES | - | - | 0.5 | - | - | - | | - |
| | ORGANIC SOLVENT | DIETHYLENE GLYCOL MONOBUTYL ETHER SP VALUE 10.0 | - | 1 | 1 | 1 | 1 | 1 | | 1 |
| | | 1,2-HEXANEDIOL SP VALUE 12.2 | - | - | - | - | - | - | | - |
| | | GLYCERIN SP VALUE 16.7 | 20 | 20 | 20 | 20 | 20 | 20 | | 20 |
| | OTHERS | ION EXCHANGE WATER | REMAINING AMOUNT | REMAINING AMOUNT | REMAINING AMOUNT | REMAINING AMOUNT | REMAINING AMOUNT | REMAINING AMOUNT | | REMAINING AMOUNT |
| SURFACE TENSION | MEASUREMENT VALUE [mN/m] | INK | 32 | 32 | 32 | 27 | 32 | 32 | 32 | 32 |
| | | REACTION SOLUTION | 30 | 36 | 30 | 30 | 20 | 44 | 30 | – |
| | | TREATMENT SOLUTION | 33 | 33 | 26 | 33 | 33 | 33 | – | 33 |
| | SEQUENCE | WHETHER SURFACE TENSION OF REACTION SOLUTION IS FROM 25 TO 40 [mN/m] OR NOT | ○ | ○ | ○ | ○ | × | × | ○ | ○ |
| | | WHETHER REACTION SOLUTION <INK≤TREATMENT SOLUTION OR NOT | ○ | × | × | × | ○ | × | – | – |
| VISCOSITY | [mPa·s] | INK VISCOSITY | 4.7 | 4.7 | 4.7 | 4.7 | 4.7 | 4.7 | 4.7 | 4.7 |
| EVALUATION RESULT | PRINTING PROPERTIES | COLOR DEVELOPABILITY | AAA | AAA | C | A | A | AA | C | C |
| | | BLEEDING | A | A | B | C | C | B | A | C |
| | | GRAININESS | A | C | A | A | A | C | A | A |
| | | YELLOWING | A | A | A | A | A | A | A | A |
| | | DISCHARGE STABILITY (INK) | A | A | A | A | A | A | A | A |
| | | DISCHARGE STABILITY (TREATMENT SOLUTION) | B | A | A | A | A | A | A | A |
| | | SURFACE TENSION STABILITY (REACTION SOLUTION) | A | A | A | A | A | A | A | A |

SET AND INK JET RECORDING METHOD

The present application is based on, and claims priority from JP Application Serial Number 2023-091424, filed Jun. 2, 2023, the disclosure of which is hereby incorporated by reference herein in its entirety.

BACKGROUND

1. Technical Field

The present disclosure relates to a set and an ink jet recording method.

2. Related Art

In the related art, a technology for performing treatment on a fabric with a treatment solution containing an aggregating agent that causes the aggregation of ink components in order to reduce bleeding has been known in textile printing (pigment printing) using an ink jet ink composition containing a pigment as a coloring material. Above all the others, discharging a treatment solution by an ink jet method to perform pigment printing has been considered.

For example, JP-A-2021-102337 discloses a treatment solution containing organopolysiloxane.

However, there are still insufficient aspects in the reduction of the bleeding and the improvement of graininess and color developability.

SUMMARY

According to an aspect of the present disclosure, a set includes:

a treatment solution composition that contains particles containing organopolysiloxane, and water;

an ink jet ink composition that contains a pigment and water; and a reaction solution that contains an aggregating agent causing aggregation of a component of the ink jet ink composition, and water, in which (a static surface tension (mN/m) of the reaction solution) <(a static surface tension (mN/m) of the ink jet ink composition)≤(a static surface tension (mN/m) of the treatment solution composition), the static surface tension of the reaction solution is from 25 to 40 mN/m, and the treatment solution composition, the ink jet ink composition, and the reaction solution are discharged by an ink jet method and used.

According to another aspect of the present disclosure, an ink jet recording method includes:

an ink deposition step of depositing an ink jet ink composition that contains a pigment and water to a fabric by an ink jet method;

a reaction solution deposition step of depositing a reaction solution that contains an aggregating agent causing aggregation of a component of the ink jet ink composition, and water to the fabric by the ink jet method; and a treatment solution deposition step of depositing a treatment solution composition included in the set according to the above-mentioned aspect to the fabric by the ink jet method after the ink deposition step, in which (a static surface tension (mN/m) of the reaction solution) <(a static surface tension (mN/m) of the ink jet ink composition)≤(a static surface tension (mN/m) of the treatment solution composition), and the static surface tension of the reaction solution is from 25 to 40 mN/m.

BRIEF DESCRIPTION OF THE DRAWINGS

FIG. 4 is a diagram illustrating a composition, physical properties, and evaluation results of each composition contained in a set according to the present disclosure (Table 1).

FIG. 5 is a diagram illustrating a composition, physical properties, and evaluation results of each composition included in the set according to the present disclosure (Table 2).

FIG. 6 is a diagram illustrating a composition, physical properties, and evaluation results of each composition included in the set according to the present disclosure (Table 3).

DESCRIPTION OF EMBODIMENTS

Figure 1:
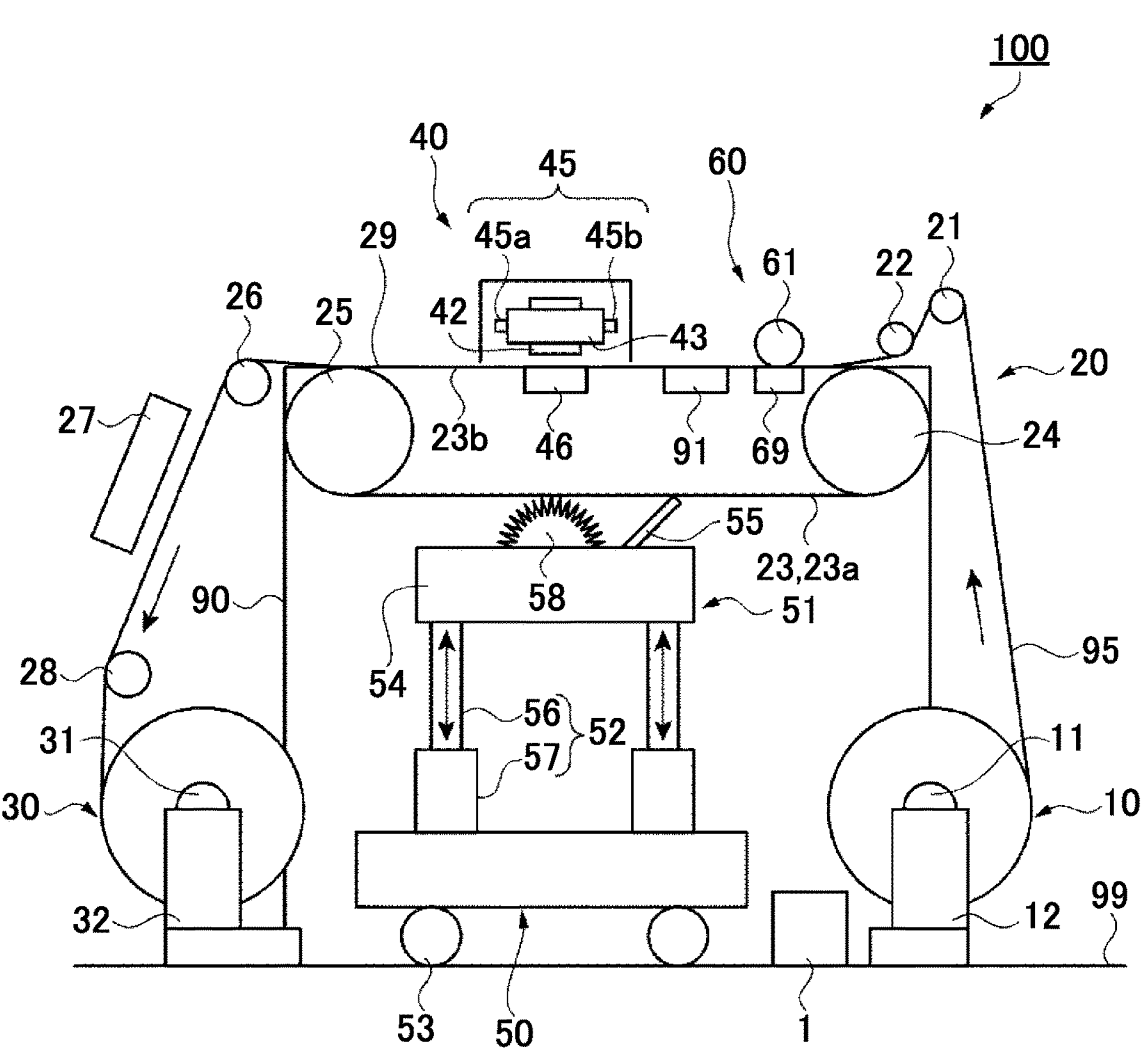
FIG. 1 is a schematic diagram of an ink jet textile printing apparatus.
Figure 1:
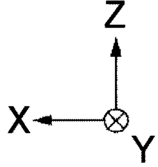

Hereinafter, embodiments of the present disclosure will be described. The embodiments described below describe examples of the present disclosure. The present disclosure is not limited to the following embodiments, and includes various modifications implemented within a range not changing the gist of the present disclosure. It should be noted that not all of the configurations described below are essential configurations of the present disclosure.

1. Set

A set according to an embodiment of the present disclosure includes a treatment solution composition that contains particles containing organopolysiloxane, and water, an ink jet ink composition that contains a pigment and water, and a reaction solution that contains an aggregating agent causing aggregation of a component of the ink jet ink composition, and water. A relation between a static surface tension (mN/m) of the reaction solution, a static surface tension (mN/m) of the ink jet ink composition, and a static surface tension (mN/m) of the treatment solution composition satisfies (the static surface tension of the reaction solution)< (the static surface tension of the ink jet ink composition)≤ (the static surface tension of the treatment solution composition). The static surface tension of the reaction solution is from 25 to 40 mN/m. The treatment solution composition, the ink jet ink composition, and the reaction solution are discharged by an ink jet method and used.

Since the ink jet ink composition is discharged by the ink jet method, the viscosity of the ink jet ink composition is designed to be low. Such an ink composition having a low viscosity is likely to permeate a recording medium such as a fabric and is likely to cause bleeding. Therefore, it is possible to prevent the permeation of the ink and reduce the bleeding by using a reaction solution that contains an aggregating agent causing aggregation of components of the ink.

On the other hand, when such a reaction solution is used, the wet-spreading of ink is likely to be reduced, and the graininess of the recorded matter may deteriorate. The "graininess" means that shades may appear on the recorded matter, or the background color of the recording medium may remain, thereby causing unevenness, because gaps occur between ink droplets (dots) on the recording medium, and gaps between the dots are not filled with color (ink droplets are not fitted).

Thus, by setting the surface tension of the reaction solution to 25 to 40 mN/m and making the surface tension of the reaction solution lower than the surface tension of the ink, the appropriate aggregability and wet-spreading of the ink were obtained, and the reduction of the bleeding and the favorable graininess could be achieved. However, in such a case, the aggregability of the reaction solution is controlled to be low in order to improve the graininess. As a result, the reaction solution easily permeates the recording medium. Accordingly, new issues have arisen in that the ink is slightly less likely to remain closer to a surface of the recording medium, and sufficient color developability is not obtained.

In contrast, it has recently been found that the color developability can be favorable by using a treatment solution having particles containing organopolysiloxane. The mechanism of improving the color developability is not clearly understood, but it is considered as one factor that light incident on an image is easily scattered and dispersed, resulting in a difficulty to cause regular reflection because a surface of an ink layer is covered with particles with a low refractive index.

While the productivity can be improved, and steps can be simplified when the treatment solution is applied by the ink jet method, the ink and the treatment solution come into contact with each other before drying. As a result, the treatment solution permeates into the lower side of the ink, which causes a difficulty to obtain a desired effect. In particular, the application by the ink jet method is carried out in a smaller amount as compared to the application by another dipping method or the like. Thus, it is difficult to obtain a desired effect even though the amount of the treatment solution that permeates into the lower side of the ink is small. Thus, by setting the surface tension of the treatment solution to be equal to or higher than the surface tension of the ink, the treatment solution can remain at a level to cover a surface of an ink layer, and it is possible to obtain the favorable color developability.

As described above, according to the set of the present embodiment, it is possible to achieve the reduction of the bleeding, and the favorable graininess and color developability.

Hereinafter, the treatment solution composition, ink jet ink composition, and reaction solution, which are included in the set according to the present embodiment, and a surface tension relationship between compositions, and the like will be described. In the present specification, the “ink jet ink composition” may be simply referred to as an “ink composition” or an “ink”. In addition, the “treatment solution composition” may be simply referred to as a “treatment solution”.

1.1 Treatment Solution Composition

The set according to the present embodiment contains a treatment solution composition that contains particles containing organopolysiloxane, and water.

The “treatment solution composition” is not a reaction solution containing an aggregating agent that causes the aggregation of an ink composition or a component of the ink composition, used to perform coloring on a recording medium, but is an auxiliary solution used together with the ink composition. The treatment solution composition may also contain a coloring material such as a pigment or the like. The content thereof is preferably 0.2% by mass or less, more preferably 0.1% by mass or less, and still more preferably 0.05% by mass or less with respect to the total mass of the treatment solution composition. The lower limit thereof is 0% by mass. The treatment solution composition preferably contains no coloring material. When the content of the coloring material is particularly 0.1% by mass or less, it is possible to more effectively bring out the property such as a low refractive index of a coating film formed of organopolysiloxane. In other words, the light incident on the coating film is less likely to be blocked by the coloring material, and the color developability of the recorded matter is likely to be further improved.

The treatment solution composition included in the set according to the present embodiment is also discharged by an ink jet method and used. The “ink jet method” is a recording method of discharging liquid droplets of ink or the like from a nozzle of an ink jet head of an ink jet recording apparatus or the like and applying the liquid droplets to a recording medium.

Hereinafter, each component contained in the treatment solution composition will be described.

1.1.1 Particle Containing Organopolysiloxane

The treatment solution composition included in the set according to the present embodiment contains particles containing organopolysiloxane. It is considered that particles cover a surface of an ink layer like oil slicks to enable the improvement of the color developability of the recorded matter.

The particles containing organopolysiloxane are not particularly limited as long as the particles contain organopolysiloxane, and may be, for example, organopolysiloxane particles themselves or particles with the organopolysiloxane dispersed by an emulsifier or the like. Furthermore, the properties of organopolysiloxane in the particles may be solid or liquid. For example, when an oily organopolysiloxane is dispersed in water in the form of particles by an emulsifier, the dispersed particles correspond to particles containing organopolysiloxane.

Organopolysiloxane is a generic term for organic silicone compounds having a siloxane bond “—$Si(R^1R^2)$—O—” as a skeleton, where a methyl group, a phenyl group, a vinyl group, an amino group, or other groups is bonded thereto as the organic groups $R^1$ and $R^2$. Due to the chemical composition and molecular weight, the organopolysiloxane exhibits oil-like (oily), rubber-like, or resin-like properties, and is referred to as silicone oil, silicone rubber, or silicone resin in each property.

The organopolysiloxane used in the treatment solution composition is more preferably an oily compound. When the organopolysiloxane is an oily compound, the organopolysiloxane is easily stably dispersed in the form of particles in an aqueous matrix by an emulsification treatment.

The molecular structure of the organopolysiloxane is not particularly limited, and examples thereof include linear, branched, cyclic, grid-like, cage-like structures, and other structures. When the molecular structure of the organopolysiloxane is an acyclic structure, one or two or more groups selected from a hydrocarbon group, an alkoxy group, a hydroxyl group, a hydrogen atom, and a halogen, which may have a substituent, are usually bonded to the terminal Si atom of this molecule.

The organopolysiloxane is not particularly limited, and examples thereof include dimethyl silicone, alkyl-modified silicone, amino-modified silicone, epoxy-modified silicone, cyclic silicone, methyl phenyl silicone, and other silicones. These may be used alone or as a mixture of two or more types thereof.

In addition, as the organopolysiloxane, those commercially available as silicone oils may be used. Examples thereof include dimethyl silicone oil (dimethyl organopolysiloxane), methyl phenyl silicone oil, methyl hydrogen silicone oil, polyether-modified silicone oil, aralkyl-modified silicone oil, fluoroalkyl-modified silicone oil, long-chain alkyl-modified silicone oil, higher fatty acid ester-modified silicone oil, higher fatty acid amide-modified silicone oil, polyether/long-chain alkyl/aralkyl-modified silicone oil, long-chain alkyl/aralkyl-modified silicone oil, phenyl-modified silicone oil, polyether/methoxy-modified silicone oil, and other oils. Among these, the organopolysiloxane is more preferably one or more selected from dimethyl silicone, methyl phenyl silicone, and methyl hydrogen silicone.

In addition, among the above-exemplified organopolysiloxanes, it is more preferable that the organopolysiloxane is a nonionic silicone. The nonionic silicone has no ionic substituent on at least a part of a side chain or a terminal of the organopolysiloxane. Examples of the nonionic silicone include dimethyl organopolysiloxane in which all of side chains and terminals of polysiloxane are methyl groups; methyl phenyl organopolysiloxane in which a part of the side chains of the polysiloxane is a phenyl group, and the like.

When the organopolysiloxane is a nonionic silicone, more chemical stability, less yellowing occurring in the formed image, and the more favorable light fastness are likely to be achieved.

Among the above-exemplified organopolysiloxanes, dimethyl organopolysiloxane is particularly preferable. Dimethyl organopolysiloxane is likely to provide remarkable chemical stability, considerably less yellowing occurring in the formed image, and remarkably favorable light fastness.

Examples of commercially available products of silicone oils include dimethyl silicone (KF-96 series, manufactured by Shin-Etsu Chemical Co., Ltd. and NP2406, manufactured by wacker asahikasei silicone co., ltd.), methyl hydrogen-type polysiloxane (KF-99 series, KF-9901, and the like, manufactured by Shin-Etsu Chemical Co., Ltd.), amino-modified silicone oil (KF-868, manufactured by Shin-Etsu Chemical Co., Ltd., NP2609, manufactured by wacker asahikasei silicone co., ltd.), methyl phenyl silicone (KF-50 series and the like, manufactured by Shin-Etsu Chemical Co., Ltd.), and silicone-branched silicone treatment agent (KF-9908, KF-9909, and the like, manufactured by Shin-Etsu Chemical Co., Ltd.).

For example, the viscosity of organopolysiloxane at 25° C. is not particularly limited, and the viscosity is preferably 1,000 mPa·s or less, more preferably 50 mPa·s or more, still more preferably 500 mPa·s or more and 900 mPa·s or less, and even still more preferably 600 mPa·s or more and 700 mPa·s or less. In addition, the base oil viscosity when organopolysiloxane is emulsified and dispersed is not particularly limited. The upper limit is preferably 1,000,000 $mm^2/s$ or less, and more preferably 100,000 $mm^2/s$ or less. The lower limit is preferably 10 $mm^2/s$ or more, and more preferably 10 $mm^2/s$ or more. The base oil viscosity indicates the viscosity of the base oil and is a numerical value obtained by measuring the magnitude of the internal resistance of the base oil. The higher the numerical value of the base oil viscosity, the higher the viscosity, and the smaller the numerical value of the base oil, the lower the viscosity.

The organopolysiloxane may be formulated with various surfactants serving as emulsifiers to be emulsified into particles. As the emulsifiers at that time, for example, nonionic surfactants, negative ion (anionic) surfactants, positive ion (cationic) surfactants, amphoteric surfactants, phospholipid, or the like can be used.

Examples of the nonionic surfactants include glycerin fatty acid esters, polyglycerin fatty acid esters, propylene glycol fatty acid esters, sorbitan fatty acid esters, fatty acid esters of sorbitol and alkylene glycol adducts thereof, polyalkylene glycol fatty acid esters, sucrose fatty acid esters, polysorbate 20, polysorbate 60, polysorbate 80, polyoxyalkylene alkyl ethers, and polyoxyethylene alkylphenyl ethers.

In addition, as the nonionic surfactants, suitably used are, for example, nonionic surfactants such as polyoxyethylene tridecyl ether, polyoxyethylene glycerin fatty acid ester, polyglycerin fatty acid esters, sorbitan fatty acid ester, polyoxyethylene sorbitan fatty acid ester, polyoxyethylene sorbit fatty acid ester, polyethylene glycol fatty acid ester, polyoxyethylene castor oil, polyoxyethylene hardened castor oil, polyoxyethylene phytosterol, polyoxyethylene polyoxypropylene alkyl ether, polyoxyethylene lanolin, polyoxyethylene lanolin alcohol, polyoxyethylene beeswax derivatives, polyoxyethylene alkylamine, polyoxyethylene fatty acid amide, polyoxyethylene alkylphenyl formaldehyde condensates, polyoxyethylene alkyl ether phosphoric acid (salt), and the like.

As the nonionic surfactant, a commercially available product may be used, and examples thereof include Newcol 1305 and 1310 (polyoxyethylene tridecyl ether, manufactured by NIPPON NYUKAZAI CO., LTD.).

Examples of the anionic surfactants include alkyl sulfate ester salt, polyoxyethylene alkyl sulfate ester salt, alkyl benzene sulfonate, and α-olefin sulfonate. Examples of the cationic surfactants include alkyltrimethylammonium chloride, dialkyldimethylammonium chloride, and benzalkonium chloride. Examples of the amphoteric surfactants include alkyl dimethyl aminoacetic acid betaine, and alkyl amido dimethyl aminoacetic acid betaine. Furthermore, naturally derived surfactants may be used, and examples thereof include lecithin, lanolin, cholesterol, and saponin.

The formulated amount of an emulsifier used in the emulsification of the organopolysiloxane is preferably from 5% to 30% by mass, more preferably from 10% to 20% by mass, and particularly preferably from 12% to 17% by mass with respect to the total amount of the organopolysiloxane.

In addition, it is desirable that the average particle diameter of emulsified particulate organopolysiloxane particles is 2 μm or less, preferably 1 μm or less, and more preferably within a range of from 0.2 to 0.8 μm.

The content of the particles containing organopolysiloxane is preferably from 5% to 20% by mass with respect to the total amount of the treatment solution composition. In this case, the color developability and discharge stability are likely to be further favorable.

Although the lower limit value of the content may be 1% by mass or more or 3% by mass or more, the color developability is likely to be favorable when the lower limit value of the content is 5% by mass or more.

The upper limit value of the content is more preferably 17% by mass or less, still more preferably 15% by mass or less, particularly preferably 13% by mass or less, and more particularly preferably 10% by mass or less. When the upper limit value of the content is 20% by mass or less, the discharge stability is likely to be further favorable.

In addition, the content of the organopolysiloxane is preferably 90% by mass or more with respect to the total solid content in the treatment solution composition. The content of the organopolysiloxane with respect to the total solid content in the treatment solution composition is more preferably 95% by mass or more, still more preferably 98% by mass or more, and even still more preferably 99% by mass or more. The content of the particles containing organopolysiloxane with respect to the total solid content in the treatment solution composition is preferably within the above-mentioned range.

When the content of the organopolysiloxane with respect to the total solid content in the treatment solution composition is 90% by mass or more, a coating film with a sufficiently low refractive index is likely to be easily formed, and an image with more favorable color developability is likely to be formable. In addition, when the treatment solution composition is discharged by an ink jet method, the discharge stability is likely to be further favorable.

1.1.2 Water

The treatment solution composition included in the set according to the present embodiment contains water. Examples of water include pure water such as ion exchange water, ultrafiltered water, reverse osmosis water, and distilled water, and water such as ultrapure water, from which ionic impurities are reduced. In addition, when water sterilized by irradiation with ultraviolet rays or addition of hydrogen peroxide or the like is used, it is possible to suppress generation of bacteria or fungi when the treatment solution composition is stored for a long period of time.

The water content is preferably 30% by mass or more, more preferably 40% by mass or more, further more preferably 45% by mass or more, even more preferably 50% by mass or more, particularly preferably 55% by mass or more, and more particularly preferably 60% by mass or more with respect to the total amount of the treatment solution composition. Since the water content is within the above-mentioned range, it is possible to maintain the treatment solution composition at a relatively low viscosity. In addition, an upper limit of the water content is not particularly limited, and preferably 90% by mass or less, more preferably 85% by mass or less, and further more preferably 80% by mass or less with respect to the total amount of the treatment solution composition.

1.1.3 Water-Soluble Organic Solvent Having SP Value of 12.5 or Less

The treatment solution composition included in the set according to the present embodiment may contain a water-soluble organic solvent having an SP value of 12.5 or less. Since the water-soluble organic solvent having an SP value of 12.5 or less has relatively high hydrophobicity, and the dispersibility of the particles containing the organopolysiloxane in the treatment solution composition is easy to be favorably maintained, the discharge stability is likely to be further favorable. It is considered that this is because the hydrophilic-hydrophobic balance between the particles containing the organopolysiloxane and water can be favorable.

Here, the SP value will be described. The SP value is based on the Hansen method. In the Hansen method, the SP value δ is classified into three terms and calculated by being expressed such that $\delta^2=\delta_d^2+\delta_p^2+\delta_h^2$. $\delta_d$, $\delta_p$, and $\delta_h$ are solubility parameters corresponding to the dispersion force term, the dipole-dipole force term, and the hydrogen bonding force term, respectively.

Furthermore, the unit of the SP value is $(cal/cm^3)^{1/2}$, and the SP value is a value (also referred to as HSP) proposed by Hansen based on an idea that "two substances with similar intermolecular interactions easily dissolve in each other". The SP value can be estimated by calculation and can also be obtained experimentally or empirically, and SP values of many materials are described in various documents. In the present embodiment, the value derived by using calculation software, Hansen-Solubility HSPiP, can be used as the SP value.

Although not limited to the following, examples of the water-soluble organic solvent having an SP value of 12.5 or less and the SP value thereof based on the Hansen method are exemplified. For example, there may be mentioned ethanol (SP value: 11.8), n-propyl alcohol (SP value: 11.8), 1,2-hexanediol (SP value: 12.2), butoxypropanol (SP value: 8.9), 2-ethyl-1,3-hexanediol (SP value: 11.6), hexane (SP value: 7.45), cyclohexane (SP value: 8.40), and 3,5,5-trimethyl-2-cyclohexene-1-one (SP value: 8.87), xylene (SP value: 8.95), ethylbenzene (SP value: 8.93), butyl acetate (SP value: 8.70), ethyl octanoate (SP value: 8.3), 3-methoxybutyl acetate (SP value: 8.71), oleic acid (SP value: 8.69), dodecyl acrylate (SP value: 8.63), diethyl ether (SP value: 7.82), ethyl propyl ether (SP value: 8.8), ethylene glycol monomethyl ether (SP value: 11.4), ethylene glycol monoisopropyl ether (SP value: 9.2), ethylene glycol monobutyl ether (SP value: 9.8), diethylene glycol monomethyl ether (SP value: 10.7), diethylene glycol monobutyl ether (SP value: 10.0), diethylene glycol monoisobutyl ether (SP value: 8.7), diethylene glycol dimethyl ether (SP value: 9.4), diethylene glycol ethyl methyl ether (SP value: 8.3), diethylene glycol diethyl ether (SP value: 8.1), diethylene glycol isopropyl methyl ether (SP value: 7.9), diethylene glycol butyl methyl ether (SP value: 8.1), diethylene glycol dibutyl ether (SP value: 7.7), propylene glycol monomethyl ether (SP value: 10.4), propylene glycol n-propyl ether (SP value: 9.8), propylene glycol n-butyl ether (SP value: 9.7), propylene glycol monophenyl ether (SP value: 9.4), dipropylene glycol monomethyl ether (SP value: 9.6), dipropylene glycol monoethyl ether (SP value: 10.9), dipropylene glycol n-propyl ether (SP value: 9.5), dipropylene glycol n-butyl ether (SP value: 9.4), dipropylene glycol dimethyl ether (SP value: 7.88), triethylene glycol monomethyl ether (SP value: 10.7), triethylene glycol monobutyl ether (SP value: 10.0), triethylene glycol dimethyl ether (SP value: 8.7), triethylene glycol butyl methyl ether (SP value: 8.0), tripropylene glycol monomethyl ether (SP value: 9.1), tripropylene glycol n-butyl ether (SP value: 9.3), tripropylene glycol dimethyl ether (SP value: 7.4), tetraethylene glycol dimethyl ether (SP value: 8.9), ethylene glycol monomethyl ether acetate (SP value: 8.96), ethylene glycol monoethyl ether acetate (SP value: 8.91), ethylene glycol monobutyl ether acetate (SP value: 8.85), diethylene glycol monobutyl ether acetate (SP value: 8.94), and dipropylene glycol monomethyl ether acetate (SP value: 8.6).

One water-soluble organic solvent having an SP value of 12.5 or less may be used alone, or a plurality of types may be used.

The water-soluble organic solvent having an SP value of 12.5 or less is more preferably a polyhydric alcohol or a glycol ether from the viewpoint of more easily stabilizing the dispersion structure of the organopolysiloxane.

As the polyhydric alcohol, 1,2-hexanediol is more preferable. The polyhydric alcohol is more preferable from the viewpoint that bleeding is less likely to occur in an image.

As the glycol ether, diethylene glycol monobutyl ether, tetraethylene glycol dimethyl ether, triethylene glycol monobutyl ether, triethylene glycol monomethyl ether, and triethylene glycol monomethyl ether are more preferable, and diethylene glycol monobutyl ether, triethylene glycol monobutyl ether, triethylene glycol monomethyl ether, and triethylene glycol monomethyl ether are particularly preferable.

Furthermore, the lower limit of the SP value of the water-soluble organic solvent having an SP value of 12.5 or less is more preferably 9 or more. In this manner, the system of the treatment solution composition can be further stabilized.

The total content of the organic solvent having an SP value of 12.5 or less is 0.01% by mass or more and 10.0% by mass or less, preferably 0.1% by mass or more and 5.0% by mass or less, more preferably 0.1% by mass or more and 3.0% by mass or less, and still more preferably 0.5% by mass or more and 1.5% by mass or less with respect to the total amount of the treatment solution composition. When the content of the organic solvent having an SP value of 12.5 or less is within such a range, the dispersion structure of the particles of organopolysiloxane is more easily stabilized, and the discharge stability is likely to be more remarkable.

1.1.4 Water-Soluble Organic Solvent Having SP Value of 13 or More

The treatment solution composition included in the set according to the present embodiment may contain a water-soluble organic solvent having an SP value of 13 or more. The water-soluble organic solvent having an SP value of 13 or more is classified as a so-called moisturizer. The water-soluble organic solvent having an SP value of 13 or more has relatively high hydrophilicity, and the dispersibility of the particles containing organopolysiloxane in the treatment solution composition is easily and more favorably maintained. It is considered that this is because the hydrophilic-hydrophobic balance between the particles containing the organopolysiloxane and the water can be further favorable. Since the water-soluble organic solvent having an SP value of 13 or more has an SP value between the water-soluble organic solvent having an SP value of 12.5 or less and water (SP value: 23.9), it is considered that the continuity of hydrophilicity or hydrophobicity can be further favorable due to both the particles containing the organopolysiloxane and the water.

Although the water-soluble organic solvent having an SP value of 13 or more is not limited to the following, examples of the organic solvent and the SP value thereof based on the Hansen method are given. For example, there may be mentioned methanol (SP value: 14.84), 1,3-butanediol (SP value: 14.47), 1,3-propanediol (SP value: 14.98), triethylene glycol (SP value: 13.5), glycerin (SP value: 16.7), trimethylolpropane (SP value: 14.4), γ-butyrolactone (SP value: 14.8), 2-pyrrolidone (γ-butyrolactam) (SP value: 14.2), ethylene glycol (SP value: 16.11), propylene glycol (SP value: 14.2), and the like. Among these, glycerin is more preferable.

One water-soluble organic solvent having an SP value of 13 or more may be used alone, or a plurality of types may be used.

The upper limit of the SP value of the water-soluble organic solvent having an SP value of 13 or more is not particularly limited, and is preferably 20 or less and more preferably 18 or less. Within such a range, the system of the treatment solution composition is likely to be further stabilizable.

When the treatment solution composition contains the water-soluble organic solvent having an SP value of 13 or more, the total content thereof is not particularly limited and is preferably 10% by mass or more and 40% by mass or less, more preferably 15% by mass or more and 35% by mass or less, still more preferably 15% by mass or more and 30% by mass or less, and particularly preferably 15% by mass or more and 25% by mass or less, with respect to the total amount of the treatment solution composition.

1.1.5 Surfactant

The treatment solution composition included in the set according to the present embodiment may include a surfactant. Among the surfactants, for example, an acetylene glycol-based surfactant, a silicone-based surfactant, and a fluorine-based surfactant can be preferably used.

The acetylene glycol-based surfactant is not particularly limited, and examples thereof include SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all trade names, manufactured by Air Products & Chemicals. Inc.), OLFINE B, Y, P, A, STG, SPC, E1004, E1010, E1020, PD-001, PD-002W, PD-003, PD-004, EXP. 4001, EXP. 4036, EXP. 4051, AF-103, AF-104, AK-02, SK-14, and AE-3 (all trade names, manufactured by Nissin Chemical Industry Co., Ltd.), and ACETYLENOL E00, EOOP, E40, and E100 (all of which are trade names, manufactured by Kawaken Fine Chemicals Co., Ltd.).

The silicone-based surfactant is not particularly limited, and examples thereof preferably include a polysiloxane-based compound. The polysiloxane-based compound is not particularly limited, and examples thereof include polyether-modified organosiloxane. Examples of commercially available products of the polyether-modified organosiloxane include BYK-306, BYK-307, BYK-333, BYK-341, BYK-345, BYK-346, and BYK-348 (all trade names, manufactured by BYK Japan KK.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all trade names, manufactured by Shin-Etsu Chemical Co., Ltd.), and SILFACE SAG002, 005, 503A, 008 (all of which are trade names, manufactured by Nissin Chemical Industry Co., Ltd.).

As the fluorine-based surfactant, a fluorine-modified polymer is preferably used, and specific examples thereof include BYK-3440 (manufactured by BYK Japan KK.), SURFLON S-241, S-242, and S-243 (all of which are trade names, manufactured by AGC SEIMI CHEMICAL CO., LTD.), and FTERGENT 215M (manufactured by NEOS COMPANY LIMITED).

When the surfactant is contained, the content is preferably from 0.01% to 2% by mass, more preferably from 0.01% to 1% by mass, and still more preferably from 0.05% to 0.5% by mass with respect to the total mass of the treatment solution composition.

1.1.6 Other Components

The treatment solution composition included in the set according to the present embodiment may contain, as necessary, components, for example, chelating agents such as organic solvents which may be contained in the ink jet ink composition described later, ethylenediaminetetraacetic acid, and salts thereof, antibacterial and fungicidal agents such as sodium 2-pyridinethiol-1-oxide, pH adjusters, additives such as ureas, amines, and sugars, viscosity modifiers, antioxidants, oxygen absorbers, solubilizing agents, and the like.

1.2 Ink Jet Ink Composition

The set according to the present embodiment includes the ink jet ink composition containing a pigment and water. The ink jet ink composition included in the set according to the present embodiment is also discharged by an ink jet method and used.

Hereinafter, each component contained in the ink jet ink composition will be described.

1.2.1 Pigment

The ink jet ink composition included in the set according to the present embodiment contains a pigment. As the pigment, for example, an inorganic pigment or an organic pigment can be used. The pigment is a kind of the coloring material. Examples of the coloring material include pigments, dyes, and the like.

The inorganic pigment is not particularly limited, and examples thereof include carbon blacks such as furnace black, lamp black, acetylene black, and channel black; and white inorganic oxides such as iron oxide, titanium oxide, zinc oxide, and silica.

Examples of carbon blacks include C.I. (Colour Index Generic Name) Pigment Black 1, 7, 11, and the like. Commercially available products may be used as the carbon blacks, for example, No. 2300, No. 900, MCF88, No. 33, No. 40, No. 45, No. 52, MA7, MA8, MA100, No. 2200B, and the like of Mitsubishi Chemical Corporation, Raven (registered trademark) 5750, 5250, 5000, 3500, 1255, and 700 of Aditya Birla Group, Regal (registered trademark) 400R, 330R, 660R, Mogul (registered trademark) L, Monarch (registered trademark) 700, 800, 880, 900, 1000, 1100, 1300, 1400, and the like of CABOT Corporation; Color Black FW1, FW2, FW2V, FW18, FW200, S150, S160, S170, Printex (registered trademark) 35, U, V, 140U, Special Black 6, 5, 4A, and 4 of Degussa Corporation, and the like.

Examples of the organic pigment include a quinacridone-based pigment, a quinacridone quinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolo-pyrrole-based pigment, a perinone-based pigment, a quinophthalone-based pigment, an anthraquinone-based pigment, a thioindigo-based pigment, a benzoimidazolone-based pigment, an isoindolinone-based pigment, an azomethine-based pigment, an azo-based pigment, or the like.

Specific examples of the organic pigment include the followings.

Examples of the cyan pigment include C. I. Pigment Blue 1, 2, 3, 15:3, 15:4, 15:34, 16, 22, 60, and the like; C. I. Vat Blue 4, 60; and the like, and are preferably a mixture of one or two or more selected from the group consisting of C. I. Pigment Blue 15:3, 15:4, and 60.

Examples of the magenta pigment include C. I. Pigment Red 5, 7, 12, 48 (Ca), 48 (Mn), 57 (Ca), 57:1, 112, 122, 123, 168, 184, 202, C. I. Pigment Violet 19, and the like, and are preferably a mixture of one or two or more selected from the group consisting of C. I. Pigment Red 122, 202, and 209, and C. I. Pigment Violet 19.

Examples of the yellow pigment include C. I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, 185, and the like, and preferably include a mixture of one or two or more selected from the group consisting of C. I. Pigment Yellow 74,109,110, 128, 138, 150, and 180.

Pigments of other colors can also be used. Examples thereof include an orange pigment, a green pigment, and the like.

The pigment may be used alone, or may be used in combination of two or more.

In order to enhance dispersibility in the ink composition, the pigment is preferably subjected to a surface treatment or formulated with a dispersant or the like.

The surface treatment of the pigment is preferably a treatment to directly or indirectly bond a carbonyl group, a carboxyl group, an aldehyde group, a hydroxyl group, a sulfone group, an ammonium group, a functional group formed of salts thereof, or the like to the surface of the pigment by physical or chemical treatment. In particular, the surface treatment is more preferably a surface treatment to modify surfaces of pigment particles such that the surface of the pigment is oxidized or sulfonated with, for example, ozone, hypochlorous acid, and fuming sulfuric acid.

When the ink composition is formulated with a dispersant, a dispersant having a hydrophobic portion (hydrophobic group) and a hydrophilic portion (hydrophilic group) in the molecular structure is preferably used. Such a dispersant has an action to cause the hydrophobic portion to be adsorbed to a particle surface of the pigment, and the hydrophilic portion to orient to an aqueous medium side of the ink composition. This action is likely to enable the pigment to be more stably contained in the ink composition as a dispersant.

Such a dispersant is not particularly limited, and examples thereof include styrene-acrylic resin such as an acrylic resin, a styrene-(meth)acrylic acid copolymer, and a styrene-(meth)acrylic acid-(meth)acrylate copolymer, a styrene-maleic acid-based resin and salts thereof, formalin condensates of aromatic sulfonate, and the like, and one or more selected from the group consisting of these can be employed. A commercially available product may be used as the dispersant.

A method of coating particles of the pigment with a resin or the like to impart dispersibility may also be used. As the method of coating particles of the pigment, an acid precipitation method, a phase inversion emulsification method, a mini-emulsion polymerization method, and the like can be employed.

A content of the pigment can be appropriately adjusted depending on the intended use, and is preferably 0.1% by mass or more and 17.0% by mass or less, more preferably 1.0% by mass or more and 15.0% by mass or less, still more preferably 2.0% by mass or more and 10.0% by mass or less, and particularly preferably 3.0% by mass or more and 8.0% by mass or less with respect to the total amount of the ink composition. When the content of the pigment is within the above-mentioned range, discharge performance during discharge by the ink jet method is likely to be further improved.

The ink composition may contain a dye as a coloring material other than the pigment. Examples of the dye include an acidic dye, a reactive dye, a direct dye, and the like.

1.2.2 Water

The ink jet ink composition included in the set according to the present embodiment contains water. As such water, the same water as that contained in the treatment solution composition described above can be used, and the content thereof can also be the same.

1.2.3 Resin Particle

The ink jet ink composition included in the set according to the present embodiment may contain resin particles. The resin particles may enable the improvement of the friction fastness of an image produced by the ink jet ink composition deposited onto the recording medium.

Examples of the resin particles include resin particles having anionic properties among resin particles formed of a urethane-based resin, an acrylic resin (including styrene-acrylic resin), a fluorene-based resin, a polyolefin-based resin, a rosin-modified resin, a terpene-based resin, a polyester-based resin, a polyamide-based resin, an epoxy-based resin, a vinyl chloride-based resin, a vinyl chloride-vinyl acetate copolymer, an ethylene vinyl acetate resin, and the like. Among these, a urethane-based resin, an acrylic resin, a polyolefin-based resin, and a polyester-based resin are preferable. These resin particles are often handled in the form of an emulsion, but may be in the form of powder. In addition, the resin particles can be used alone or in combination of two or more thereof.

Among these, a urethane-based resin is more preferably used for the resin particles. When the urethane-based resin is selected, an image having more favorable friction fastness is likely to be formable.

The urethane-based resin is a generic term for resins having a urethane bond. As the urethane-based resin, in addition to a urethane bond, a polyether-type urethane resin including an ether bond in the main chain, a polyester-type urethane resin including an ester bond in the main chain, a polycarbonate-type urethane resin including a carbonate bond in the main chain, and the like may be used.

In addition, as the urethane-based resin, a commercially available product may be used, and for example, commercially available products such as SUPERFLEX 460, 460s, 840, and E-4000 (trade names, manufactured by DKS Co., Ltd.), RESAMINE D-1060, D-2020, D-4080, D-4200, D-6300, and D-6455 (trade names, manufactured by Dainichiseika Color & Chemicals Mfg. Co., Ltd.), Takelac WS-5100, 6021, and W-512-A-6 (trade names, manufactured by Mitsui Chemicals & SKC Polyurethanes Inc.), Sancure 2710 (trade name, manufactured by Lubrizol Corporation), PERMARIN UA-150 (trade name, manufactured by Sanyo Chemical Industries Ltd.), ETERNACOLL UW series, for example, UW-1527 or the like, (manufactured by UBE Corporation), and the like may be used.

A content of the resin particles is preferably 1.0% by mass or more, more preferably from 1.0% to 20% by mass, still more preferably from 2.0% to 15% by mass, and particularly preferably from 3.0% to 10.0% by mass in terms of solid content with respect to the total amount of the ink composition. When the content of the resin particles is within the above-mentioned range, a recorded matter having further favorable friction fastness is likely to be obtained.

1.2.4 Organic Solvent

The ink jet ink composition included in the set according to the present embodiment may contain an organic solvent. The organic solvent is preferably water-soluble. One of the functions of the organic solvent is to improve the wettability of the ink jet ink composition with respect to a recording medium or to enhance the moisture retention properties of the ink jet ink composition. The organic solvent can also function as a penetrant.

Examples of the organic solvent include alcohols, alkylene glycol ethers, esters, cyclic esters, nitrogen-containing solvents, and the like. Examples of the nitrogen-containing solvents include cyclic amides and acyclic amides. Examples of the acyclic amides include alkoxyalkylamides.

Examples of alcohols include a compound in which one hydrogen atom of alkane is substituted with a hydroxyl group. The alkane may be a linear or branched-type. Examples of alcohols include methanol, ethanol, n-propyl alcohol, iso-propyl alcohol, n-butanol, 2-butanol, tert-butanol, iso-butanol, n-pentanol, 2-pentanol, 3-pentanol, and tert-pentanol.

Alkylene glycol ethers are also called penetrating solvents because of the excellent permeability. The alkylene glycol ethers may be alkylene glycol monoethers or diethers, and alkyl ethers are preferable. Specific examples include alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether (BTG, standard boiling point 278° C.), tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monobutyl ether; alkylene glycol dialkyl ethers such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, tripropylene glycol dimethyl ether; and the like.

When glycol ethers are used, the number of carbon atoms thereof is preferably 12 or less, more preferably 8 or less, and preferably 6 or less. The lower limit is preferably 2 or more, still more preferably 3 or more, and more preferably 5 or more. The number of carbon atoms is the number of carbon atoms in the molecule.

Examples of esters include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, methoxybutyl acetate; glycol diesters such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, dipropylene glycol acetate propionate, and the like.

Examples of cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone; compounds in which a hydrogen of a methylene group adjacent to a carbonyl group thereof is substituted with an alkyl group having from 1 to 4 carbon atoms, and the like.

Examples of the cyclic amides include lactams, and examples thereof include pyrrolidones such as 2-pyrrolidone, 1-methyl-2-pyrrolidone, 1-ethyl-2-pyrrolidone, 1-propyl-2-pyrrolidone, and 1-butyl-2-pyrrolidone.

Examples of alkoxyalkylamides include 3-methoxy-N, N-dimethylpropionamide, 3-methoxy-N, N-diethylpropionamide, 3-methoxy-N, N-methylethylpropionamide, 3-ethoxy-N, N-dimethylpropionamide, 3-ethoxy-N, N-diethylpropionamide, 3-ethoxy-N, N-methylethylpropionamide, 3-n-butoxy-N, N-dimethylpropionamide, 3-n-butoxy- N, N-diethylpropionamide, 3-n-butoxy-N, N-methylethylpropionamide, 3-n-propoxy-N, N-dimethylpropionamide, 3-n-propoxy-N, N-diethylpropionamide, 3-n-propoxy-N, N-methylethylpropionamide, 3-iso-propoxy-N, N-dimethylpropionamide, 3-iso-propoxy-N, N-diethylpropionamide, 3-iso-propoxy-N, N-methylethylpropionamide, 3-tert-butoxy-N, N-dimethylpropionamide, 3-tert-butoxy-N, N-diethylpropionamide, 3-tert-butoxy-N, N-methylethylpropionamide, and the like.

Polyhydric alcohols have two or more hydroxyl groups in the molecule. Examples of the polyhydric alcohol include alkanediols, polyols, and the like, and one or more selected from these is preferable. The polyhydric alcohol may be liquid or solid at room temperature and normal pressure, and a liquid state is preferable.

Examples of alkanediols include compounds in which alkane is substituted with two hydroxyl groups. Examples of alkanediols include ethylene glycol (also known as ethane-1,2-diol), propylene glycol (also known as propane-1,2-diol), 1,2-butanediol, 1,2-pentanediol, 1,2-hexanediol, 1,2-octanediol, 1,3-propanediol, 1,3-butylene glycol (also known as 1,3-butanediol), 1,4-butanediol, 2,3-butanediol, 1,2-pentanediol, 1,5-pentanediol, 2,4-pentanediol, 2-methyl-1,3-propanediol, 3-methyl-1,3-butanediol, 3-methyl-1,5-pentanediol, 2-ethyl-1,3-hexanediol, 2-methyl-1,3-pentanediol, 3-methyl-1,5-pentanediol, 2-methylpentane-2,4-diol, 1,6-hexanediol, 2-ethyl-2-methyl-1,3-propanediol, 2-methyl-2-propyl-1,3-propanediol, and the like.

Examples of the polyols include a condensate in which two or more molecules of alkanediols are intermolecularly condensed between hydroxyl groups, a compound having three or more hydroxyl groups, and the like.

Examples of the condensates in which two or more molecules of alkanediols are intermolecularly condensed between hydroxyl groups include dialkylene glycols such as diethylene glycol and dipropylene glycol, trialkylene glycol such as triethylene glycol (standard boiling point 287° C.) and tripropylene glycol, and the like.

The compound having three or more hydroxyl groups has three or more hydroxyl groups having an alkane or polyether structure as a skeleton. Examples of the compound having three or more hydroxyl groups include glycerin (standard boiling point 290° C.), trimethylolethane, trimethylolpropane, 1,2,5-hexanetriol, 1,2,6-hexanetriol, pentaerythritol, polyoxypropylenetriol, and the like.

Among these, the organic solvent preferably contains a polyhydric alcohol, and more preferably contains a polyhydric alcohol having a standard boiling point of 250° C. or higher.

In addition, the content of the polyhydric alcohol having a standard boiling point of 250° C. or higher is preferably 1% by mass or more, more preferably 5% by mass or more, even more preferably 10% by mass or more, still even more preferably 13% by mass or more, and particularly preferably 15% by mass or more, with respect to the total amount of the ink jet ink composition. The upper limit is not particularly limited, but is preferably 40% by mass or less, more preferably 35% by mass or less, still more preferably 30% by mass or less, even still more preferably 25% by mass or less, and particularly preferably 20% by mass or less.

When the content of the polyhydric alcohol having a standard boiling point of 250° C. or higher is within the above range, the balance between moisture retention properties and dryness is likely to be excellent, and both discharge stability and friction fastness are likely to be favorable.

The standard boiling point of the polyhydric alcohol having a standard boiling point of 250° C. or higher described above is more preferably 270° C. or higher, and still more preferably 280° C. or higher.

The content of the organic solvent is preferably from 5% to 30% by mass, more preferably from 10% to 25% by mass, and still more preferably from 15% to 20% by mass with respect to the total amount of the ink jet ink composition. When the content of the organic solvent is within the above-mentioned range, the balance between moisture retention properties and dryness is likely to be excellent, and both discharge stability and friction fastness are likely to be favorable.

1.2.5 Surfactant

The ink jet ink composition included in the set according to the present embodiment may contain a surfactant. As such a surfactant, the same surfactant as that contained in the treatment solution composition described above can be used.

When the surfactant is contained, the content is preferably from 0.01% to 3% by mass, more preferably from 0.05% to 2% by mass, still more preferably from 0.1% to 1% by mass, and particularly preferably from 0.2% to 0.8% by mass with respect to the total mass of the ink jet ink composition.

1.2.6 Other Components

The ink jet ink composition included in the set according to the present embodiment may contain a pH adjuster. The pH adjuster is not particularly limited, and examples thereof include an appropriate combination of acids, bases, weak acids, and weak bases.

As examples of acids and bases used in such a combination, inorganic acids such as sulfuric acid, hydrochloric acid, and nitric acid; inorganic bases such as lithium hydroxide, sodium hydroxide, potassium hydroxide, dihydrogen potassium phosphate, hydrogen disodium phosphate, potassium carbonate, sodium carbonate, hydrogen sodium carbonate, and ammonia; organic bases such as triethanol amine, diethanol amine, monoethanol amine, tripropanol amine, triisopropanol amine, diisopropanol amine, and tris(hydroxymethyl)aminomethane (THAM); and organic acids such as adipic acid, citric acid, succinic acid, lactic acid, Good's buffers such as N, N-bis(2-hydroxyethyl)-2-aminoethanesulfonic acid (BES), 4-(2-hydroxyethyl)-1-piperazineethanesulfonic acid (HEPES), morpholinoethanesulfonic acid (MES), carbamoylmethyl iminobisacetic acid (ADA), piperazine-1,4-bis(2-ethanesulfonic acid) (PIPES), N-(2-acetamide)-2-aminoethanesulfonic acid (ACES), cholamine chloride, N-tris(hydroxymethyl)methyl-2-aminoethanesulfonic acid (TES), acetamide glycine, tricine, glycine amide, and bicine, a phosphate buffer solution, a citrate buffer solution, a tris buffer solution, and the like may be used. Among these, an organic base is preferable, and triethanolamine is more preferable.

In the ink jet ink composition, the pH adjuster may be used alone, or may be used in combination of two or more. In addition, a total content of the ink jet ink composition with respect to the total mass when the pH adjuster is used is, for example, 0.05% by mass or more and 3.0% by mass or less, and more preferably 0.1% by mass or more and 1.0% by mass or less.

The ink jet ink composition included in the set according to the present embodiment may contain, as necessary, components, for example, chelating agents such as ethylenediaminetetraacetic acid, and salts thereof, antibacterial and fungicidal agents such as sodium 2-pyridinethiol-1-oxide, additives such as ureas, amines, and sugars, viscosity modifiers, antioxidants, oxygen absorbers, solubilizing agents, and the like.

1.2.7 Viscosity

The viscosity of the ink jet ink composition included in the set according to the present embodiment is preferably from 3 to 10 mPa·s, more preferably from 3 to 8 mPa·s, and still more preferably from 3.5 to 6 mPa·s. When the viscosity is 3 mPa·s or more, more favorable color developability is likely to be obtained. When the viscosity is 10 mPa·s or less, more favorable discharge stability is likely to be obtained. The viscosity can be measured using, for example, a viscoelasticity tester MCR-300 (product name), manufactured by Pysica.

1.3 Reaction Solution

The set according to the present embodiment includes a reaction solution that contains an aggregating agent causing aggregation of components of the above-mentioned ink jet ink composition, and water, and the reaction solution is discharged by an ink jet method and used.

In the use of the reaction solution discharged by such an ink jet method, a separate apparatus or equipment is not necessary unlike a treatment method such as dipping method in the related art. In addition, it is possible to simplify the process and eliminate waste liquid discharge. In addition, since the reaction solution is applied by the ink jet method, the bleeding is less likely to occur in an image even though the application amount of the reaction solution is large as compared with when the reaction solution is applied by a spray or the like instead of the ink jet method. It is presumed that this is because, when the reaction solution is applied by the ink jet method, the discharge amount can be controlled to be small, and the ink can be brought into immediate contact with the reaction solution by the wet-on-wet method. Thus, the reaction between the reaction solution and the ink easily proceeds.

When the application is carried out by a spray or the like instead of the ink jet method, it is difficult to control the discharge amount to be small. In addition, it is necessary to undergo a drying step, and the ink is not brought into immediate contact with the reaction solution by the wet-on-wet method. Therefore, the reaction between the reaction solution and the ink deteriorates. That is, after a large amount of the reaction solution is applied to the recording medium by a spray or the like and dried, due to the fact that the reaction solution itself permeates the inside of the recording medium, or reaction between components of the reaction solution after drying and the ink is solid/liquid reaction, the ink that lands afterwards does not immediately aggregate, and permeation or bleeding of the ink occurs.

The "reaction solution" is not the ink composition used for coloring the recording medium or the above-mentioned treatment solution composition, but is an auxiliary solution for aggregating the components of the ink composition used together with the ink composition. The reaction solution may contain a coloring material such as a pigment or the like. The content thereof is preferably 0.2% by mass or less, more preferably 0.1% by mass or less, and still more preferably 0.05% by mass or less with respect to the total mass of the reaction solution. The lower limit is 0% by mass. The reaction solution preferably contains no coloring material.

Hereinafter, each component contained in the reaction solution will be described.

1.3.1 Aggregating Agent

The reaction solution included in the set according to the present embodiment contains an aggregating agent causing aggregation of the components of the ink jet ink composition described above. The aggregating agent has an effect of causing aggregation of a pigment and the like by reacting components such as the pigment contained in the ink. A degree of aggregation of the pigment by the aggregating agent differs depending on each type of the aggregating agent, the pigment, and the like, and can be adjusted. The aggregating agent can act to enhance the color development of the pigment, enhance the fixability of the resin particles, and/or increase the viscosity of the ink.

The aggregating agent is preferably at least one selected from cationic compounds and acids when the pigment contained in the ink is an anionic dispersed pigment, in particular.

The cationic compound can cause aggregation of the anionic dispersed pigment in the ink by salting-out. Examples of the cationic compounds include polyvalent metal salts, cationic resins, cationic surfactants, and the like.

The polyvalent metal salt is a compound composed of a divalent or higher valent metal ions and an anion. Examples of the divalent or higher valent metal ions include ions such as calcium, magnesium, copper, nickel, zinc, barium, aluminum, titanium, strontium, chromium, cobalt, iron, and the like. Among the metal ions constituting these polyvalent metal salts, the metal ions are preferably at least one of calcium ions or magnesium ions from the viewpoint of excellent aggregability of the components of the ink.

The anions constituting the polyvalent metal salt are inorganic ions or organic ions. That is, the polyvalent metal salt in the present disclosure is formed of an inorganic ion or an organic ion and a polyvalent metal. Examples of the inorganic ions include chloride ions, bromine ions, iodine ions, nitrate ions, sulfate ions, and hydroxide ions. Examples of the organic ions include organic acid ions, and examples thereof include carboxylic acid ions.

The polyvalent metal compound is preferably an ionic polyvalent metal salt, and in particular, when the polyvalent metal salt is a magnesium salt or a calcium salt, the stability of the reaction solution is further improved. In addition, as a counter ion of the polyvalent metal, any of an inorganic acid ion and an organic acid ion may be used.

Specific examples of the polyvalent metal salts include calcium carbonate such as heavy calcium carbonate and light calcium carbonate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium formate, calcium acetate, magnesium acetate, aluminum acetate, and the like.

These polyvalent metal salts may be used alone, or may be used in combination of two or more thereof. In addition, the metal salts that are hydrated in their raw material form may also be used.

The cationic resin is a resin having a cationic group. Examples of the resin include urethane-based resin, acrylic resin, fluorene-based resin, polyolefin-based resin, rosin-modified resin, terpene-based resin, polyester-based resin, polyamide-based resin, epoxy-based resin, vinyl chloride-based resin, and vinyl chloride-vinyl acetate copolymer, ethylene vinyl acetate-based resin, and the like. Among these, a urethane resin, an acrylic resin, and a polyolester-based resin are preferable.

Examples of the cationic group include an amino group, an ammonium group, an amide group, a hydration group, and the like. The amino group includes a primary amine group, a secondary amine group, and a tertiary amine group. In addition, one or more cationic groups may be contained in the resin.

Examples of the resin having a primary amine group include polyallylamine, polyallylamine hydrochloride, polyallylamineamide sulfate, methoxycarbonylated allylamine polymer, methylcarbonylated allylamine acetate polymer, a ureated polyallylamine polymer, a carboxylmethylated polyallylamine polymer, a hexamethylenediamine/epichlorohydrin resin, and the like.

Examples of the resin having a secondary amine group include a diallylamine polymer, a diallylamine hydrochloride polymer, a diallylamine hydrochloride/sulfur dioxide copolymer, a diallylamine acetate/sulfur dioxide copolymer, a diallylamine hydrochloride/acrylamide copolymer, a dimethylamine/epichlorohydrin resin, a dimethylamine/ammonia/epichlorohydrin resin, a dimethylamine/ethylenediamine/epichlorohydrin polymer, and the like.

Examples of the resin having a tertiary amine group include a methyldiallylamine hydrochloride polymer, a methyldiallylamineamide sulfate polymer, a methyldialylamine acetate polymer, a methyldiallylamine hydrochloride/sulfur dioxide copolymer, a dicyandiamide/polyalkylene polyamine polycondensate, and the like.

Examples of a resin having an ammonium group include a resin having a quaternary ammonium base, and examples of such resins include a diallyldimethylammonium chloride polymer, a diallylmethylethylammonium ethylsulfate polymer, a diallylmethylethylammonium ethylsulfate/sulfur dioxide copolymer, a diallyldimethylammonium chloride/sulfur dioxide copolymer, a diallyldimethylammonium chloride/acrylamide copolymer, and the like. Examples of commercially available products of the resin having a quaternary ammonium base include PAS-H-1L, PAS-H-5L, PAS-H-10L; PAS-24; PAS-2401; PAS-A-1, PAS-A-5; PAS-J-81L, PAS-J-81, PAS-J-41 (manufactured by Nittobo Medical Co., Ltd.), EP-1137 (manufactured by Takamatsu Oil & Fat Co., Ltd.), FPA-100L, Papiogen P-105, Milliogen P-20 (SENKA CORPORATION), SN dispersant 4215 (manufactured by San Nopco Ltd., active ingredient 20% by weight, quaternary cationic polymer), and the like.

Examples of the resin having an amide group include polyamide, polyamide epoxy resin, and the like.

Examples of the cationic surfactant include primary, secondary, and tertiary amine salt type compounds, alkylamine salts, dialkylamine salts, aliphatic amine salts, benzalconium salts, quaternary ammonium salts, quaternary alkylammonium salt, alkylpyridinium salt, sulfonium salt, phosphonium salt, onium salt, and imidazolinium salt. Specific examples of the cationic surfactant include hydrochlorides such as laurylamine, cocoamine, and rosinamine, acetates, lauryltrimethylammonium chloride, cetyltrimethylammonium chloride, benzyltributylammonium chloride, benzalkonium chloride, dimethylethyllaurylammonium ethyl sulfate, dimethylethyloctyl ammonium ethyl sulfate, trimethyl lauryl ammonium hydrochloride, cetyl pyridinium chloride, cetyl pyridinium bromide, dihydroxyethyl lauryl amine, decyl dimethyl benzyl ammonium chloride, dodecyl dimethyl benzyl ammonium chloride, tetradecyl dimethyl ammonium chloride, hexa decyl dimethyl ammonium chloride, and octa decyl dimethyl ammonium chloride.

The acid can cause the anionic dispersed pigments to aggregate in the ink due to pH fluctuations. Examples of the acid include organic acids and inorganic acids.

Preferable examples of the organic acid include poly (meth)acrylic acid, acetic acid, glycolic acid, malonic acid, malic acid, maleic acid, ascorbic acid, succinic acid, glutaric acid, fumaric acid, citric acid, tartaric acid, lactic acid (DL-), sulfonic acid, orthophosphoric acid, pyrrolidonecarboxylic acid, pyrone carboxylic acid, pyrrole carboxylic acid, furancarboxylic acid, pyridine carboxylic acid, coumaric acid, thiophene carboxylic acid, nicotinic acid, derivatives of these compounds, and salts thereof. The organic acid may be used alone or in combination of two or more thereof. Metal salts which are salts of organic acids are included in the metal salts described above.

Examples of the inorganic acid include sulfuric acid, hydrochloric acid, nitric acid, phosphoric acid, and the like. The inorganic acid may be used alone or in combination of two or more thereof.

Among these, the aggregating agent is preferably a polyvalent metal salt. The bleeding can be likely to be suppressed due to the strong aggregation force of the polyvalent metal salt. On the other hand, when the aggregation force is strong, the wet-spreading of the ink is likely to be reduced, and the graininess may be inferior. In contrast, it is possible to more favorably suppress bleeding and achieve favorable graininess by employing the set according to the present embodiment even though the aggregating agent is a polyvalent metal salt.

In addition, the polyvalent metal salt is preferably a magnesium salt. For example, when the polyvalent metal salt is a calcium salt, the aggregability is excellent, but the aggregation reaction may be difficult to control, and friction fastness or graininess on the recording medium may deteriorate. On the other hand, the magnesium salt exhibits a gentle aggregation reaction with ink as compared with other salts such as a calcium salt, so that the reaction is easily controlled. Therefore, the color developability is likely to be favorable, and the friction fastness and graininess are also likely to be favorable.

A content of the aggregating agent is preferably from 0.5% to 1.0% by mass, more preferably from 1% to 8% by mass, still more preferably 2% to 7% by mass, and particularly preferably 3% to 7% by mass with respect to a total amount of the reaction solution. When the content is 0.5% by mass, the suppression of the color developability and bleeding are more excellent. In addition, when the content is 10% by mass or less, the wet-spreading is more favorable, and the graininess is likely to be more excellent.

In particular, from the viewpoint of obtaining excellent color developability and bleeding control, as well as favorable graininess, a content of the polyvalent metal salt is preferably from 0.5% to 10% by mass, more preferably from 1% to 8% by mass, still more preferably from 2% to 7% by mass, and particularly preferably from 3% to 7% by mass with respect to a total amount of the reaction solution.

1.3.2 Surfactant

The reaction solution included in the set according to the present embodiment may contain a surfactant. As such a surfactant, the same surfactant as that contained in the treatment solution composition described above can be used.

Among the surfactants, the reaction solution included in the set according to the present embodiment more preferably contains a surfactant having an HLB value of 10 or more. Here, the HLB value is determined from the balance between a hydrophilic group and a lipophilic group of the surfactant molecule, a high HLB value indicates a surfactant having high hydrophilicity, and a low HLB value qualitatively indicates that the surfactant has high lipophilicity.

The HLB value in the present specification is defined as follows. The “hydrophilic lipophilic balance (HLB) value” is calculated by the Griffin method. Specifically, the HLB value of the surfactant can be calculated according to the following equation (H).

$$\text{HLB value} = 20 \times (\text{\% by mass of hydrophilic group}) \quad \text{(H)}$$

When the reaction solution contains a surfactant having an HLB value of 10 or more, the change in the surface tension becomes gradual, and more favorable storage stability of the reaction solution is likely to be obtained.

The upper limit of the HLB value in the surfactant having an HLB value of 10 or more is not particularly limited, and is preferably 20 or less, more preferably 18 or less, and still more preferably 15 or less. In addition, the lower limit of the HLB value is preferably 11 or more, and still more preferably 12 or more.

Examples of commercially available products of the surfactant having an HLB value of 10 or more include OLFINE E1010 (HLB value of 13 to 14), OLFINE E1020 (HLB value of 15 to 16), OLFINE E1030W (HLB value of 15 to 16), and SURFYNOL 485 (HLB value of 17) (All of which are trade names, manufactured by Nissin Chemical Industry Co., Ltd.), BYK348 (HLB value of 11) (trade name, manufactured by BYK Japan KK), SURFLON S-242 (HLB value of 12) (trade name, manufactured by AGC SEIMI CHEMICAL CO., LTD.), and the like.

When the surfactant is contained, the content is preferably from 0.1% to 5% by mass, more preferably from 0.5% to 3% by mass, still more preferably from 0.8% to 2% by mass, and particularly preferably from 1% to 1.5% by mass with respect to the total mass of the reaction solution.

1.3.3 Water

The reaction solution included in the set according to the present embodiment may contain water. As such water, the same water as that contained in the treatment solution composition described above can be used, and the content thereof can also be the same.

1.3.4 Organic Solvent

The reaction solution included in the set according to the present embodiment may contain an organic solvent. As such an organic solvent, the same organic solvent as that contained in the above-mentioned ink jet ink composition can be used, and the content can be the same.

1.3.5 Other Components

The reaction solution included in the set according to the present embodiment may contain, as necessary, components, for example, chelating agents such as ethylenediaminetetraacetic acid, and salts thereof, antibacterial and fungicidal agents such as sodium 2-pyridinethiol-1-oxide, additives such as ureas, amines, and sugars, viscosity modifiers, antioxidants, oxygen absorbers, solubilizing agents, and the like.

1.4 Surface Tension

The set according to the present embodiment satisfies the following relation between a static surface tension (mN/m) of the reaction solution, a static surface tension (mN/m) of the ink jet ink composition, and a static surface tension (mN/m) of the treatment solution composition: (the static surface tension of the reaction solution)<(the static surface tension of the ink jet ink composition)≤(the static surface tension of the treatment solution composition), and the static surface tension of the reaction solution is from 25 to 40 mN/m.

1.4.1 Measurement Value

The static surface tension can be measured by a Wilhelmy method with a surface tension meter (manufactured by Kyowa Interface Science Co., Ltd., DY-300). The static surface tension is preferably a measurement value at 20° C.

Reaction Solution

As mentioned above, the static surface tension of the reaction solution is 25 to 40 mN/m, more preferably from 25 to 35 mN/m, still more preferably from 27 to 35 mN/m, and particularly preferably from 27 to 33 mN/m.

When the static surface tension of the reaction solution is within the above-mentioned range, the aggregability and wet-spreading of the ink are likely to be more appropriately obtained, and the reduction of the bleeding and the favorable graininess can be obtained.

Treatment Solution Composition

The static surface tension of the treatment solution composition is more preferably from 28 to 45 mN/m, still more preferably from 28 to 40 mN/m, particularly preferably from 30 to 38 mN/m, and more particularly preferably from 30 to 35 mN/m.

When the static surface tension of the treatment solution composition is 28 mN/m or more, the treatment solution is likely to remain easily to the extent of covering the surface of the ink layer, and the favorable color developability is easily achieved. On the other hand, when the static surface tension of the treatment solution composition is 45 mN/m or less, the deterioration of the bleeding of the image is likely to be further reduced.

Ink Jet Ink Composition

The static surface tension of the ink jet ink composition is preferably from 27 to 40 mN/m, more preferably from 27 to 37 mN/m, and still more preferably from 29 to 34 mN/m.

When the static surface tension of the ink jet ink composition is within the above-mentioned range, the aggregability and wet-spreading of the ink are likely to be more appropriately obtained, and the reduction of the bleeding and the favorable graininess can be obtained.

1.4.2 Relation Between Surface Tensions

In the set according to the present embodiment, a static surface tension (mN/m) relation between the reaction solution, the ink jet ink composition, and the treatment solution composition satisfies the following expression. (The static surface tension of the reaction solution)<(the static surface tension of the ink jet ink composition)≤(the static surface tension of the treatment solution composition)

As mentioned above, by making the surface tension of the reaction solution lower than the surface tension of the ink, the appropriate aggregability and wet-spreading of the ink are obtained, and the reduction of the bleeding and the favorable graininess are likely to be achieved. In addition, by setting the surface tension of the treatment solution to be equal to or higher than the surface tension of the ink, the treatment solution is likely to remain at a level to cover the surface of the ink layer, and the favorable color developability can be obtained.

1.5 Recording Medium

The treatment solution composition, the ink jet ink composition, and the reaction solution, which are included in the set according to the present embodiment, are preferably used with being deposited onto a fabric. The use of the treatment solution composition, ink jet ink composition, and reaction solution by deposition onto the fabric is likely to cause issues such as the bleeding and the color developability; however, with the set according to the present embodiment, the reduction of the bleeding and the favorable color developability can be achieved even in such a case.

The material constituting the fabric is not particularly limited, and examples thereof may include natural fibers such as cotton, linen, wool, and silk; synthetic fibers such as polypropylene, polyester, acetate, triacetate, polyamide, and polyurethane, and biodegradable fibers such as polylactic acid, and blended fibers thereof. As the fabric, the fiber may be any form of a woven fabric, a knitted fabric, a nonwoven fabric, and the like.

In addition, the basis weight of the fabric used in the present embodiment is not particularly limited, and may be 1.0 oz or more and 10.0 oz or less, preferably 2.0 oz or more and 9.0 oz or less, more preferably 3.0 oz or more and 8.0 oz or less, and even more preferably 4.0 oz or more and 7.0 oz or less. When the basis weight of the fabric is within such a range, favorable recording can be performed. In addition, in the set according to the present embodiment, a plurality of types of fabrics having different basis weights can be applied, and favorable printing can be performed.

In the present embodiment, examples of the form of the fabric include cloth, garment and other clothing ornaments, and the like. The cloth includes a woven fabric, a knitted fabric, a nonwoven fabric, and the like. Garment and other clothing ornaments include sewn T-shirts, handkerchiefs, scarves, towels, handbags, and fabric furniture such as bags, curtains, sheets, bedspreads, and wallpaper, cloth before and after cutting as parts to be sewn, and the like. Examples of these forms include a long roll-shaped product, a product cut into a predetermined size, and a product having the shape of a manufactured product.

As the fabric, a cotton fabric pre-colored with a dye may be used. Examples of dyes with which the fabric is pre-colored include water-soluble dyes such as acidic dyes and basic dyes, disperse dyes used in combination with dispersants, and reactive dyes. When the cotton fabric is used as the fabric, a reactive dye suitable for dyeing cotton is preferably used.

2. Ink Jet Recording Method

An ink jet recording method according to an embodiment of the present disclosure includes an ink deposition step of depositing an ink jet ink composition that contains a pigment and water to a fabric by an ink jet method, a reaction solution deposition step of depositing a reaction solution that contains an aggregating agent causing aggregation of a component of the ink jet ink composition, and water to the fabric by the ink jet method, and a treatment solution deposition step of depositing the treatment solution composition contained in the above-mentioned set to the fabric by the ink jet method after the ink deposition step. A relation between a static surface tension (mN/m) of the reaction solution, a static surface tension (mN/m) of the ink jet ink composition, and a static surface tension (mN/m) of the treatment solution composition satisfies (the static surface tension of the reaction solution)<(the static surface tension of the ink jet ink composition)≤(the static surface tension of the treatment solution composition). The static surface tension of the reaction solution is from 25 to 40 mN/m.

According to the ink jet recording method according to the present embodiment, it is possible to reduce the bleeding and improve graininess and color developability in the same manner as the set described above.

Hereinafter, each step of the ink jet recording method according to the present embodiment will be described. In the ink jet recording method according to the present embodiment, the above-mentioned set can be preferably used.

2.1 Ink Deposition Step

The ink jet recording method according to the present embodiment includes an ink deposition step of depositing the ink jet ink composition containing a pigment and water to the fabric by the ink jet method.

As the ink jet ink composition, it is possible to preferably apply the ink jet ink composition contained in the above-mentioned set. The description of the ink jet ink composition used in the ink jet recording method according to the present embodiment is as described above. Thus, the description thereof will not be repeated. The fabric is also as described above. Thus, the description thereof will not be repeated.

The deposition amount of the ink jet ink composition with respect to a unit area of the fabric is preferably from 10 to 60 g/m$^2$, more preferably from 15 to 50 g/m$^2$, still more preferably from 20 to 40 g/m$^2$, and particularly preferably from 25 to 35 g/m$^2$.

The ink jet method in the ink jet recording method according to the present embodiment preferably includes main scanning a plurality of times to perform the recording such that an ink jet head is moved in a direction perpendicular to a transport direction of the fabric. The ink deposition step may be performed a plurality of times of the same main scanning to deposit the ink jet ink composition to the same scanning region of the fabric.

The ink jet method is a recording method of discharging a liquid droplet of ink or the like from a nozzle of an ink jet head of an ink jet recording apparatus and the like and applying the liquid droplet to a recording medium. Furthermore, the main scanning for performing recording by moving the ink jet head in the direction perpendicular to the transport direction of the fabric is, for example, scanning for performing recording while a carriage 43 having an ink jet head 42 reciprocally moves in a direction (Y axis direction) perpendicular to a transport direction (+X axis direction) of a fabric 95 in the recording apparatus in FIG. 1.

When the same main scanning is performed a plurality of times on the same scanning region, the main scanning to deposit the ink composition passes over the same region of the fabric a plurality of times. As the number of times of scanning increases, the ink can be deposited onto a desired region a plurality of times (in a plurality of times of pass), and the image quality of the obtained recorded matter is likely to be further improved.

In addition, when recording is performed on any region, the number of times of pass by the ink jet head on the region described above is also referred to as a "pass". For example, when the main scanning to deposit the ink is performed four times on the same region, the number of passes is referred to as four passes. For example, in FIG. 2, when the length of one sub-scanning in a sub-scanning direction (+X axis direction) is one fourth of the length of a nozzle row in the sub-scanning direction (+X axis direction), four scannings are performed on a rectangular scanning region having a length of the one sub-scanning in the sub-scanning direction (+X axis direction) and extending in the main scanning direction (Y axis direction). The number of times of scanning when viewed as described above is referred to as the number of scannings or the number of passes.

The number of times of the main scanning in the ink deposition step is not particularly limited, but may be, for example, one or more, preferably two or more, more preferably four or more, and still more preferably eight or more. In addition, the upper limit of the number of times of the main scanning is not particularly limited, and is, for example, preferably 32 or less, and more preferably 16 or less. According to the ink jet recording method of the present embodiment, even though the number of times of the main scanning in the ink deposition step is within the above-mentioned range, the favorable color developability is likely to be obtained.

2.2 Reaction Solution Deposition Step

The ink jet recording method according to the present embodiment includes the reaction solution deposition step of depositing the reaction solution that contains the aggregating agent causing aggregation of the component of the ink jet ink composition, and water to the fabric by the ink jet method; and As the reaction solution, it is possible to preferably apply the reaction solution contained in the above-mentioned set. The description of the reaction solution used in the ink jet recording method according to the present embodiment is as described above. Thus, the description thereof will not be repeated. In addition, the static surface tensions and the relation between the reaction solution, the ink jet ink composition, and the treatment solution composition are the same as those described in the above-mentioned set. Thus the description thereof will not be repeated.

The deposition amount of the reaction solution with respect to a unit area of the fabric is preferably from 10 to 60 $g/m^2$, more preferably from 15 to 50 $g/m^2$, still more preferably from 20 to 40 $g/m^2$, and particularly preferably from 25 to 35 $g/m^2$.

The sequence of the reaction solution deposition step is not particularly limited, and preferably performed simultaneously with the above-mentioned ink deposition step, or before the ink deposition step. The reaction solution deposition step is more preferably performed simultaneously with the ink deposition step.

The fact that the reaction solution deposition step is performed simultaneously with the above-mentioned ink deposition step refers to an aspect in which the reaction solution and the ink jet ink composition are deposited onto the same scanning region of the fabric by the same main scanning (hereinbelow, referred to as "simultaneous deposition"). According to such an aspect, the layer containing the reaction solution and the ink jet ink composition can be formed in the same main scanning. Thus, both the reaction solution and the ink jet ink composition are easily mixed and easily reacted with each other. Accordingly, the thickening/aggregation of the ink is further promoted, and the ink component is likely to remain closer to the surface of the fabric. Thus, the more favorable color developability is likely to be obtained. In addition, the high productivity can be achieved.

In addition, when the reaction solution deposition step is performed simultaneously with the ink deposition step, it is preferable that the same main scanning to deposit the reaction solution and the ink jet ink composition is performed a plurality of times onto the same scanning region of the fabric in a manner similar to the above-mentioned ink deposition step. In such a case, a layer containing the reaction solution and the ink jet ink composition is deposited to a certain region of the fabric by a certain main scanning. Furthermore, a layer containing the reaction solution and the ink jet ink composition can be then overlapped and deposited onto the former layer by another main scanning. Accordingly, since the reaction solution and the ink jet ink composition are alternately overlapped and laminated (overlapped in the form of mille-feuille), the components of both are more easily mixed with each other and the reaction more easily proceeds. Therefore, the thickening/aggregation of the ink is further promoted, the ink component is likely to remain closer to the surface of the fabric, and the color developability is likely to be further improved. The preferable number of times of main scanning can be set to the same number as that in the above-described ink deposition step.

Specifically, the fact that the reaction solution deposition step is performed before the above-mentioned ink deposition step refers to the fact that the above-mentioned ink deposition step is performed according to an aspect in which the ink jet ink composition is deposited onto the same scanning region of the fabric by a subsequent main scanning different from the main scanning at which the reaction solution deposition step is performed. According to such an aspect, the reaction solution can be firstly discharged by the ink jet method to be a base for forming an ink layer on the fabric, so that the more favorable color developability is likely to be obtained.

The time difference between the reaction solution deposition step and the above-mentioned ink deposition step is not particularly limited as long as the reaction solution deposition step is performed simultaneously with the ink deposition step, and preferably 1 second or less, more preferably 0.7 seconds or less, and preferably 0.3 seconds or less. In addition, even though the reaction solution deposition step is performed before the above-mentioned ink deposition step, it is preferable to perform the reaction solution deposition step within 5 seconds. When those steps are performed with such a time difference, a wet-on-wet method can be employed, the wet-on-wet method enabling, before a firstly deposited liquid droplet of the reaction solution is dried, the deposition of a subsequently deposited liquid droplet of the ink. In such a wet-on-wet method, although advantages such as reduction in size of an apparatus and high speed operation are achieved, the deterioration of the bleeding and color developability easily occurs. However, according to the ink jet recording method of the present embodiment, even though the wet-on-wet method as described above is used, the color developability can be likely to be made excellent, and the bleeding can be likely to be suppressed.

The phrase "time difference between the reaction solution deposition step and the ink deposition step" refers to a time difference from the last discharge of the reaction solution to the first discharge of the ink jet ink composition, and in particular, refers to a time difference from the last discharge of the reaction solution to the first discharge of the ink jet ink composition with respect to the same scanning region of the fabric.

2.3 Treatment Solution Deposition Step

The ink jet recording method according to the present embodiment has, after the above-mentioned ink deposition step, a treatment solution deposition step of depositing the treatment solution composition contained in the above-mentioned set to the fabric by the ink jet method.

The treatment solution composition is as described above, and the description will not be repeated.

The deposition amount of the treatment solution composition with respect to a unit area of the fabric is preferably from 10 to 55 $g/m^2$, more preferably from 10 to 45 $g/m^2$, still more preferably from 10 to 35 $g/m^2$, particularly preferably from 10 to 25 $g/m^2$, and more particularly preferably from 10 to 20 $g/m^2$.

The treatment solution deposition step included in the ink jet recording method according to the present embodiment is performed after the above-mentioned ink deposition step (hereinafter, also referred to as "post-deposition"). More specifically, the treatment solution deposition step is performed according to an aspect in which the treatment solution composition is deposited onto the same scanning region of the fabric by a subsequent main scanning different from the main scanning at which the above-mentioned ink deposition step is performed. According to such an aspect, it is possible to suppress the permeation of the treatment solution into the lower side of the ink and to form a treatment solution layer to cover a previously-formed ink layer. As a result, a surface of the ink layer is sufficiently covered with the particles containing organopolysiloxane, and an effect such as the color developability is preferably obtained.

Similarly to the above-mentioned ink deposition step, in the treatment solution deposition step, the same main scanning to deposit the treatment solution composition may be performed a plurality of times with respect to the same scanning region of the fabric.

The number of times of main scanning in the treatment solution deposition step is one or more, preferably two or more, more preferably three or more, and still more preferably four or more. In addition, the upper limit of the number of times of scanning in the treatment solution deposition step is not particularly limited, but for example, preferably 12 or less, and more preferably 8 or less. According to the ink jet recording method of the present embodiment, even though the number of times of the main scanning in the treatment solution deposition step is within the above-mentioned range, the favorable color developability are likely to be obtained.

The time difference between the treatment solution deposition step and the above-mentioned ink deposition step is not particularly limited, but is preferably within 10 seconds, more preferably within 9 seconds, still more preferably within 8 seconds, even still more preferably within 7 seconds, particularly preferably within 6 seconds, and still particularly preferably within 5 seconds. The lower limit of the time difference is not particularly limited, but is preferably 1.0 seconds or longer, more preferably 3.0 seconds or longer, and still more preferably 4.5 seconds or longer.

With such a time difference, the favorable suppression of the bleeding can be likely to be achieved while improving the productivity.

The phrase "time difference between the treatment solution deposition step and the ink deposition step" refers to a time difference from the last discharge of the ink composition to the first discharge of the treatment solution composition, and in particular, refers to a time difference from the last discharge of the ink composition to the first discharge of the treatment solution composition with respect to the same scanning region of the fabric.

2.4 Drying Step

The ink jet recording method according to the present embodiment may include a drying step between the ink deposition step and the treatment solution deposition step described above or after those steps.

The drying step can be performed by a unit that performs drying using a drying mechanism. Examples of the unit that performs drying using a drying mechanism include a unit that blows room temperature air or warm air onto a fabric (ventilation type), a unit that irradiates the fabric with radiation (such as infrared rays) which generates heat, (radiation type), a member that comes into contact with the fabric and conducts heat to the fabric (conduction type), and a combination of two or more of these units. When the drying step is included, it is preferable to perform the drying step by a drying mechanism that heats the fabric. When the drying mechanism that heats the fabric is used as a drying mechanism, it is particularly referred to as a heating step.

The method of heating the fabric is not particularly limited, and examples thereof include a heat press method, a normal pressure steam method, a high pressure steam method, a thermofix method, and other methods. A heat source when heating is carried out is not particularly limited, and for example, an infrared lamp and the like can be used. The heating temperature is preferably a temperature at which resin particles in the ink are fused, and a medium such as moisture volatilizes. For example, the heating temperature is preferably 100° C. or higher and 200° C. or lower, more preferably 130° C. or more and 180° C. or lower, and still more preferably 150° C. or more and 170° C. or lower. Here, the heating temperature in the heating step refers to a surface temperature of an image and the like formed on a fabric. Although the time for carrying out heating is not particularly limited, 30 seconds or longer and 20 minutes or less are employed, for example.

In the ink jet recording method according to the present embodiment, it is preferable not to include the drying step between the ink deposition step and the treatment solution deposition step. Accordingly, an image having the favorable color developability can be likely to be obtained in a shorter time.

2.5 Ink Jet Textile Printing Apparatus

An example of an ink jet textile printing apparatus provided with an ink jet head, which can be applied to the ink jet recording method according to the present embodiment, will be described with reference to FIG. 1.

The scales of each layer and each member illustrated in FIG. 1 are made different from the actual scales thereof to be visually recognized in the drawing. In addition, for the convenience of illustration in FIG. 1, as three axes orthogonal to each other, an X axis, a Y axis, and a Z axis are illustrated, a front end side of each arrow indicating an axis direction illustrated in the drawing is represented by "+ side", and a base end side thereof is represented by "− side". A direction parallel to the X axis, a direction parallel to the Y axis, and a direction parallel to the Z axis are represented by an "X axis direction", a "Y axis direction", and a "Z axis direction", respectively.

2.5.1 Overall Schematic Configuration

FIG. 1 is a schematic diagram illustrating a schematic overall configuration of a recording apparatus 100. First, the overall configuration of the recording apparatus 100 will be described with reference to FIG. 1.

As illustrated in FIG. 1, the recording apparatus 100 includes a medium transport portion 20, a medium adhesion portion 60, a belt support portion 91, a print portion 40, a heating unit 27, a cleaning unit 50, and the like. In the recording apparatus 100, at least one of the medium adhesion portion 60 or the belt support portion 91 corresponds to a heating portion to heat an endless belt 23. In addition, the recording apparatus 100 also includes a control portion 1 to control each of these portions described above. Each of the portions of the recording apparatus 100 is attached to a frame portion 90.

When the heating portion to heat the endless belt is provided, the heating portion may be provided closer to upstream than the print portion 40 in the transport direction and may also be provided at a place different from where the medium adhesion portion 60 and the belt support portion 91 are disposed. For example, the heating portion may be provided closer to upstream than the medium adhesion portion 60 in the transport direction. By employing such a configuration, the heating portion can also dry the endless belt 23 wetted during cleaning. In addition, the heating portion may be a portion to heat the endless belt in a non-contact manner.

The medium transport portion 20 transports the fabric 95 in the transport direction. The medium transport portion 20 is provided with a medium feeding portion 10, transport rollers 21 and 22, the endless belt 23, a belt rotation roller 24, a belt drive roller 25 functioning as a drive roller, transport rollers 26 and 28, and a medium collecting portion 30.

2.5.2 Medium Transport Portion

First, a transport path of the fabric 95 from the medium feeding portion 10 to the medium collecting portion 30 will be described. In FIG. 1, a direction along a direction in which the gravity works is represented by the Z axis direction, a direction in which the fabric 95 is transported on the print portion 40 is represented by the +X axis direction, and a width direction of the fabric 95 intersecting both the Z axis direction and the X axis direction is represented by the Y axis direction. In addition, the positional relationship along the transport direction of the fabric 95 or the moving direction of the endless belt 23 is also represented by "upstream" or "downstream".

The medium feeding portion 10 is a portion to feed the fabric 95 on which an image is to be formed to the print portion 40 side. The medium feeding portion 10 includes a feeding shaft portion 11 and a bearing portion 12. The feeding shaft portion 11 is formed in a cylindrical shape or a columnar shape and is provided to be rotatable in a circumferential direction. The strip-shaped fabric 95 is wound around the feeding shaft portion 11 in a roll shape. The feeding shaft portion 11 is detachably attached to the bearing portion 12. Accordingly, the fabric 95 wound around the feeding shaft portion 11 in advance can be attached to the bearing portion 12 together with the feeding shaft portion 11.

The bearing portion 12 rotatably supports both ends of the feeding shaft portion 11 in a shaft direction. The medium feeding portion 10 includes a rotation drive portion (not illustrated) that rotatably drives the feeding shaft portion 11. The rotation drive portion rotates the feeding shaft portion 11 in a direction where the fabric 95 is fed. The operation of the rotation drive portion is controlled by the control portion 1. The transport rollers 21 and 22 relay the fabric 95 from the medium feeding portion 10 to the endless belt 23.

The endless belt 23 is held between at least two rollers to rotate the endless belt 23. Since the endless belt 23 rotationally moves, the fabric 95 is transported in the transport direction (+X axis direction) while being supported by the endless belt 23. Specifically, the endless belt 23 is a seamless belt formed such that both end portions of a strip-shaped belt are seamlessly coupled to each other, and is set between two rollers of the belt rotation roller 24 and the belt drive roller 25.

The endless belt 23 is held with a predetermined tension applied thereto so that a portion between the belt rotation roller 24 and the belt drive roller 25 is held with being horizontal. An adhesive 29 provided for adhesion of the fabric 95 is applied onto a surface (support surface) 23*a* of the endless belt 23. That is, the endless belt 23 is provided with an adhesive layer formed of the adhesive 29. The fabric 95 is attached to the endless belt 23 with the adhesive 29 interposed therebetween. The endless belt 23 supports (holds) the fabric 95 which is fed by the transport roller 22 and adheres to the adhesive 29 by the medium adhesion portion 60.

The adhesive 29 preferably increases its adhesiveness by heating. Since the adhesive 29 which increases its adhesiveness by heating is used, the fabric 95 can preferably adhere to the adhesive layer. As such an adhesive 29, a hot melt-based adhesive which contains a thermoplastic elastomer styrene-isoprene-styrene (SIS) as a primary component is exemplified.

The belt rotation roller 24 and the belt drive roller 25 support an inner circumferential surface 23*b* of the endless belt 23. A contact portion 69 to support the endless belt 23, the belt support portion 91, and a platen 46 are provided between the belt rotation roller 24 and the belt drive roller 25. The contact portion 69 is provided in a region facing a press portion 61 described later with the endless belt 23 interposed therebetween, the platen 46 is provided in a region facing the print portion 40 with the endless belt 23 interposed therebetween, and the belt support portion 91 is provided between the contact portion 69 and the platen 46. Since the contact portion 69, the belt support portion 91, and the platen 46 support the endless belt 23, the endless belt 23 is prevented from being vibrated in conjunction with the movement of the endless belt 23.

The belt drive roller 25 is a drive portion to transport the fabric 95 in the transport direction by rotating the endless belt 23 and has a motor (not illustrated) to rotatably drive the belt drive roller 25. The belt drive roller 25 is provided closer to downstream than the print portion 40 in the transport direction of the fabric 95, and the belt rotation roller 24 is provided closer to upstream than the print portion 40. When the belt drive roller 25 is rotatably driven, the endless belt 23 is rotated in conjunction with the rotation of the belt drive roller 25, and the belt rotation roller 24 is rotated by the rotation of the endless belt 23. Since the endless belt 23 is rotated, the fabric 95 supported by the endless belt 23 is transported in the transport direction (+X axis direction), and an image is formed at the fabric 95 on the print portion 40 described later.

In the example illustrated in FIG. 1, the fabric 95 is supported at the side (+Z axis side) at which the surface 23*a* of the endless belt 23 faces the print portion 40, and the fabric 95 is transported together with the endless belt 23 from the belt rotation roller 24 side to the belt drive roller 25 side. In addition, the endless belt 23 is only moved from the belt drive roller 25 side to the belt rotation roller 24 side at the side (−Z axis side) at which the surface 23*a* of the endless belt 23 faces the cleaning unit 50.

The transport roller 26 peels away the fabric 95 on which an image is formed from the adhesive 29 provided on the endless belt 23. The transport rollers 26 and 28 relay the fabric 95 from the endless belt 23 to the medium collecting portion 30.

The medium collecting portion 30 collects the fabric 95 transported from the medium transport portion 20. The medium collecting portion 30 includes a winding shaft portion 31 and a bearing portion 32. The winding shaft portion 31 is formed in a cylindrical or columnar shape and provided to be rotatable in a circumferential direction. The strip-shaped fabric 95 is wound around the winding shaft portion 31 in a roll shape. The winding shaft portion 31 is detachably attached to the bearing portion 32. Accordingly, the fabric 95 wound around the winding shaft portion 31 is removed together with the winding shaft portion 31.

The bearing portion 32 rotatably supports both ends of the winding shaft portion 31 in a shaft direction. The medium collecting portion 30 includes a rotation drive portion (not illustrated) which rotatably drives the winding shaft portion 31. The rotation drive portion rotates the winding shaft portion 31 in a direction in which the fabric 95 is wound. The operation of the rotation drive portion is controlled by the control portion 1.

Next, the heating portion, the print portion 40, the heating unit 27, and the cleaning unit 50, which are provided along the medium transport portion 20, will be described.

2.5.3 Heating Portion

It is preferable that a heater that heats the endless belt 23 is provided in at least one of the contact portion 69 or the belt support portion 91. The heater constitutes the heating portion. When the heater is provided in the contact portion 69, a pressing force and heat can be applied to the endless belt 23 by the press portion 61, which is preferable from the viewpoint that the adhesion of the fabric 95 to the endless belt 23 can be improved. Accordingly, when being provided in the contact portion 69 or the belt support portion 91, the heater is more preferably provided at the contact portion 69.

The heating portion softens the adhesive layer by heating the adhesive layer to exhibit adhesiveness, thereby improving the adhesion between the fabric 95 and the adhesive layer. Accordingly, the fabric 95 is prevented from moving on the endless belt 23. Thus, favorable transport accuracy can be obtained.

When the heater is provided in at least one of the contact portion 69 or the belt support portion 91, and the endless belt 23 is heated, the temperature of the surface 23*a* of the endless belt 23 is preferably 80° C. or lower, more preferably 70° C. or lower, and still more preferably 60° C. or lower. When the temperature of the surface 23*a* of the endless belt 23 is within the above-mentioned range, the reactivity of the resin particles, which may be contained in the ink composition, is suppressed, and the cleaning of the belt can be more easily performed in some cases. The lower limit of the temperature of the surface 23*a* of the endless belt 23 is not particularly limited as long as the temperature causes the adhesiveness of the adhesive layer to be exhibited, and is preferably 30° C. or higher, more preferably 35° C. or higher, and still more preferably 40° C. or higher. The temperature of the surface 23*a* of the endless belt 23 can be measured by, for example, a radiation type thermometer, a contact type thermometer, or the like, and the temperature described above is more preferably measured by a radiation type thermometer.

When the heater is provided in at least one of the contact portion 69 or the belt support portion 91, a temperature detection portion (not illustrated) that detects the surface temperature of the endless belt 23 may be provided. As the temperature detection portion, for example, a thermocouple or the like can be used. Accordingly, since the heater is controlled by the control portion 1 based on the temperature detected by the temperature detection portion, the endless belt 23 can have a predetermined temperature. The temperature detection portion may also use a non-contact type thermometer using infrared rays.

2.5.4 Print Portion

The print portion 40 is arranged at the upper side (+Z axis side) of a position where the endless belt 23 is arranged and performs printing on the fabric 95 placed on the surface 23*a* of the endless belt 23. The print portion 40 includes a carriage 43 on which the ink jet head 42 is mounted and a carriage moving portion 45 that moves the carriage 43 in the width direction (Y axis direction) of the fabric 95, which intersects the transport direction.

The ink jet head 42 is a unit that sprays the ink composition and the treatment solution supplied from a liquid cartridge (not illustrated) from a plurality of nozzles to the fabric 95 under control by the control portion 1 to deposit the ink composition, treatment solution, and reaction solution to the fabric 95. The ink jet head 42 is provided with a plurality of nozzles that discharge ink or the like to be deposited onto the fabric 95 at the side facing the fabric 95 where the ink jet ink composition, the treatment solution composition, and the reaction solution (also referred to below as "ink or the like") are deposited. The plurality of nozzles are aligned in a row to form a nozzle row, and the nozzle row is individually arranged corresponding to the ink or the like. The ink or the like is supplied from each liquid cartridge to the ink jet head 42 and discharged in the form of liquid droplets from the nozzles by an actuator (not illustrated) provided in the ink jet head 42. The liquid droplets of the ink or the like thus discharged are landed on the fabric 95 and are subjected to the deposition process to the fabric 95 to form an image, text, pattern, color, or the like by the ink in a textile printing region of the fabric 95.

Here, although a piezoelectric element is used in the ink jet head 42 as the actuator which serves as a drive unit, the drive unit is not limited thereto. For example, an electromechanical conversion element that displaces a vibration plate as an actuator by electrostatic adsorption, or an electrothermal conversion element that discharges ink and the like as liquid droplets by air bubbles generated by heating may be used.

For example, a plurality of types of the ink jet head 42 including an ink jet head 42*a* having a head nozzle group for discharging the reaction solution, an ink jet head 42*b* having a head nozzle group for discharging the ink jet ink composition, and an ink jet head 42*c* having a head nozzle group for discharging the treatment solution composition are provided in the carriage 43. The discharge head nozzle groups mean nozzle groups used for recording in the recording method. The nozzle groups may discharge ink or the like from the nozzles when an image to be temporarily recorded is provided on a region of the fabric facing the nozzle groups at a time of performing the main scanning (Y axis direction), and are continuously arranged in the transport direction (+X axis direction). Therefore, a nozzle group, which exists as the nozzle group itself, but is not used for recording in the recording method, is not included in the discharge nozzle groups.

In the ink jet recording method according to the present embodiment, the head nozzle group that discharges the reaction solution is arranged at the same position as that of the head nozzle group that discharges the ink jet ink composition in the transport direction of the fabric or has an overlapping portion with the head nozzle group that discharges the ink jet ink composition in the transport direction. The head nozzle group that discharges the treatment solution composition is preferably provided closer to downstream than the head nozzle group that discharges the ink jet ink composition in the transport direction of the fabric.

In addition, from a similar point of view, an ink jet head that discharges the reaction solution is arranged at the same position as that of an ink jet head that discharges the ink jet ink composition in the transport direction of the fabric or has an overlapping portion with the ink jet head that discharges the ink jet ink composition in the transport direction. An ink jet head that discharges the treatment solution composition is preferably provided closer to downstream than the ink jet head that discharges the ink jet ink composition in the transport direction of the fabric.

With such a configuration, the above-mentioned simultaneous deposition and post-deposition can be suitably performed.

Figure 2:
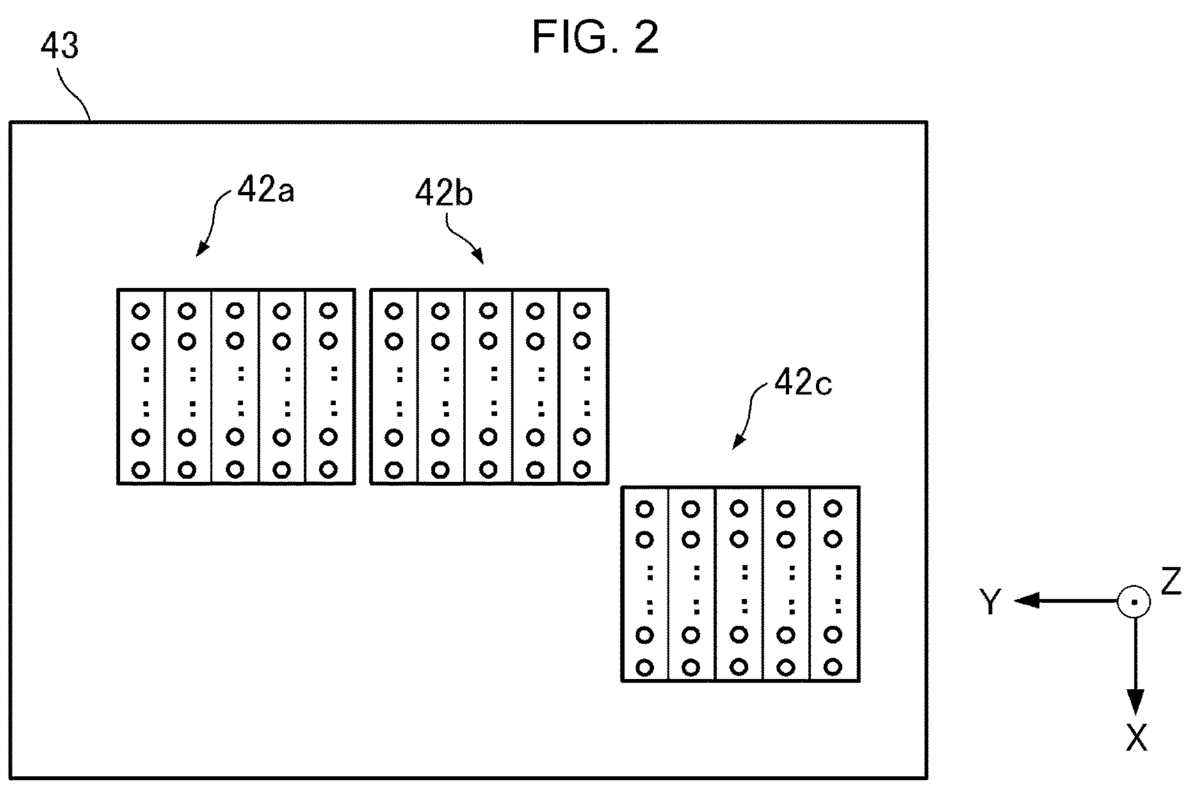
FIG. 2 is a schematic diagram illustrating an example of an arrangement of ink jet heads.

For example, according to the example of a head arrangement illustrated in FIG. 2, the head nozzle group of the ink jet head 42*a*, which discharges the reaction solution, is arranged side by side at the same position as the head nozzle group of the ink jet head 42*b*, which discharges the ink jet ink composition, in the transport direction of the fabric 95 (+X axis direction), and the head nozzle group of the ink jet head 42*c*, which discharges the treatment solution composition, is arranged closer to downstream than the head nozzle group of the ink jet head 42*b*, which discharges the ink jet ink composition, in the transport direction of the fabric 95 (+X axis direction). With such a head arrangement configuration, the above-mentioned simultaneous deposition and post-deposition can be suitably performed. The nozzle groups illustrated in FIG. 2 are the head nozzle groups for discharge, which are separately included in the ink jet heads. The ink jet head 42*a* and the ink jet head 42*b* may also be arranged in the opposite way.

Figure 3:
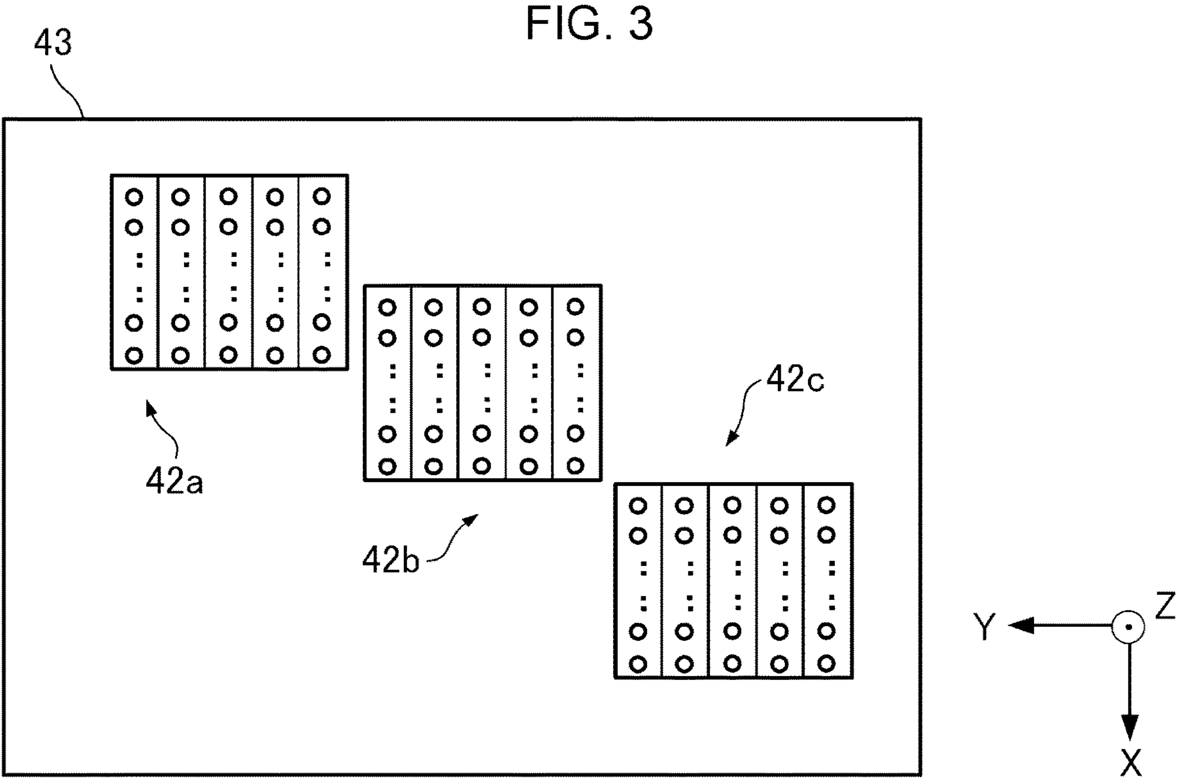
FIG. 3 is a schematic diagram illustrating an example of an arrangement of the ink jet heads.

For example, according to the example of a head arrangement illustrated in FIG. 3, the head nozzle group of the ink jet head 42*a*, which discharges the reaction solution, is not arranged side by side at the same position as the head nozzle group of the ink jet head 42*b*, which discharges the ink jet ink composition, but has an overlapping portion in the transport direction of the fabric 95 (+X axis direction), and the head nozzle group of the ink jet head 42*c*, which discharges the treatment solution composition, is arranged closer to downstream than the head nozzle group of the ink jet head 42*b*, which discharges the ink jet ink composition, in the transport direction of the fabric 95 (+X axis direction). With such a head arrangement configuration, the above-mentioned simultaneous deposition and post-deposition can be suitably performed. The nozzle groups illustrated in FIG. 3 are the head nozzle groups for discharge, which are separately included in the ink jet heads. The ink jet head 42*a* and the ink jet head 42*b* may also be arranged in the opposite way.

The "overlapping portion" refers to a portion of the head nozzle group that discharges the ink jet ink composition used for the recording that is at the same position as a portion of the head nozzle group that discharges the reaction solution used for the recording in the transport direction of the fabric 95 (+X axis direction). As a result, a layer containing the reaction solution and the ink jet ink composition can be formed in the same main scanning.

The carriage moving portion 45 is provided on the upper side (+Z axis side) of the endless belt 23. The carriage moving portion 45 has a pair of guide rails 45*a* and 45*b* extending along the Y axis direction. The ink jet head 42 is supported by the guide rails 45*a* and 45*b* to be reciprocally movable along the Y axis direction together with the carriage 43.

The carriage moving portion 45 includes a moving mechanism (not illustrated) and a power source. As the moving mechanism, for example, a mechanism in which a ball screw and a ball nut are combined, a linear guide mechanism, or the like can be used. The carriage moving portion 45 includes a motor (not illustrated) as the power source for moving the carriage 43 along the guide rails 45*a* and 45*b*. As the motor, various motors such as a stepping motor, a servo motor, and a linear motor can be used. When the motor is driven under the control of the control portion 1, the ink jet head 42 moves in the Y axis direction together with the carriage 43.

2.5.5 Heating Unit

The heating unit 27 may be provided between the transport roller 26 and the transport roller 28. The heating unit 27 heats the ink or the like, which has discharged onto the fabric 95. The heating unit 27 may be used to dry the fabric 95. Examples of the heating unit 27 include an IR heater, and the IR heater can be operated to cause the ink or the like discharged onto the fabric 95 to react in a short period. As a result, the strip-shaped fabric 95 on which an image or the like has been formed can be wound around the winding shaft portion 31.

2.5.6 Cleaning Unit

The cleaning unit 50 is arranged between the belt rotation roller 24 and the belt drive roller 25 in the X axis direction. The cleaning unit 50 includes a cleaning portion 51, a press portion 52, and a movement portion 53. The movement portion 53 integrally moves the cleaning unit 50 along a floor surface 99 and then fixes the cleaning unit 50 at a predetermined position.

The press portion 52 is an elevating device formed, for example, of an air cylinder 56 and a ball bush 57 and enables the cleaning portion 51 provided on the upper side to come into contact with the surface 23*a* of the endless belt 23. The cleaning portion 51 is set between the belt rotation roller 24 and the belt drive roller 25 with a predetermined tension applied, and carries out the cleaning of the surface (support surface) 23*a* of the endless belt 23 moving from the belt drive roller 25 toward the belt rotation roller 24 from a bottom side (−Z axis direction).

The cleaning portion 51 includes a cleaning tank 54, a cleaning roller 58, and a blade 55. The cleaning tank 54 stores a cleaning solution used to clean ink and foreign matters accumulated onto the surface 23*a* of the endless belt 23, and the cleaning roller 58 and the blade 55 are provided inside the cleaning tank 54. As the cleaning solution, for example, water or a water-soluble solvent (such as an aqueous alcohol solution) may be used, and as necessary, a surfactant and a defoaming agent may also be added.

When the cleaning roller 58 is rotated, the cleaning solution is supplied to the surface 23*a* of the endless belt 23, and at the same time, the cleaning roller 58 and the endless belt 23 slide-contact to each other. Accordingly, the ink composition, the fibers of the fabric 95, and the like accumulated onto the endless belt 23 are removed by the cleaning roller 58.

The blade 55 may be formed of, for example, a flexible material such as a silicone rubber. The blade 55 is provided closer to downstream than the cleaning roller 58 in the transport direction of the endless belt 23. Since the endless belt 23 and the blade 55 slide-contact to each other, the cleaning solution remaining on the surface 23*a* of the endless belt 23 is removed.

3. Examples

Hereinafter, the present disclosure will be described in more detail with reference to examples, but the present disclosure is not limited to these examples. Hereinafter, "%" is based on mass unless otherwise specified.

3.1 Preparation of Each Composition

Each component was put into a container to provide the compositions illustrated in Tables 1 to 3 (FIGS. 4 to 6), ion exchange water was added to obtain the total amount of each composition of 100% by mass, the mixture was mixed and stirred with a magnetic stirrer for 2 hours, and then filtered by using a 5 μm PTFE membrane filter to obtain an ink jet ink composition and a reaction solution included in the set according to each Example or each Comparative Example.

In the ink jet ink composition, a pigment dispersion was prepared in advance and used for ink preparation. As for the preparation of the pigment dispersion, 20 g of S170 (trade name manufactured by Degussa AG), which is a commercially available carbon black, was mixed with 500 g of water and dispersed for 5 minutes with a home mixer. The obtained liquid was put into a 3 L glass container with a stirring apparatus, and 500 mL/min of an ozone-containing gas having an ozone concentration of 8% by mass was introduced while stirring the liquid with a stirrer. At that time, an ozone generator generated ozone by using an electrolytic generation type ozonizer manufactured by Permelec electrode Co., Ltd. In addition, by adjusting the introduction time from 1 minute to 1 hour, the desired surface modification can be performed. The obtained dispersion raw material was filtered through glass fiber filter GA-100 (trade name, manufactured by Advantec Toyo Kaisha, Ltd.), and 0.1 N of potassium hydroxide solution was added until the solid content concentration was 20% by mass to adjust pH to 9, and concentrated to obtain a black pigment dispersion.

The treatment solution composition included in the set according to each of Examples or each of Comparative Examples was prepared as follows. 90 g of silicone oil, 171.4 g of ion exchange water, 6.4 g of polyoxyethylene tridecyl ether (Newcol 1310, manufactured by NIPPON NYUKAZAI CO., LTD.), 6.4 g of polyoxyethylene tridecyl ether (Newcol 1305, manufactured by NIPPON NYUKAZAI CO., LTD), and 25.7 g of diethylene glycol monobutyl ether were added into a beaker, and the content of the beaker was stirred using a homo mixer (manufactured by Primix BV, Homo Mixer Mark II2.5), at a rotation speed of 2,000 rpm and 50° C. for 30 minutes, and the mixture was left to stand for 30 minutes. Next, the content in the beaker was filtered through a 10 μm membrane filter to obtain 300 g of an emulsion in which oil particles containing amino-modified silicone oil were dispersed. Subsequently, the remaining ion exchange water, an organic solvent such as glycerin, and the surfactant were added and stirred to obtain the compositions illustrated in Tables 1 to 3 (FIGS. 4 to 6).

The surface tension was measured by a Wilhelmy method using a surface tension meter (manufactured by Kyowa Interface Science Co., Ltd., DY-300). The viscosity was measured using, for example, a viscoelasticity tester MCR-300 (trade name, manufactured by Pysica).

3.2 Printing Method

An apparatus modified from EVO TRE 16 (manufactured by Seiko Epson Corporation) was filled with the ink jet ink composition, the treatment solution composition, and the reaction solution obtained above, and a solid pattern image of 20 cm×5 cm was formed on a fabric serving as a recording medium of 100% cotton white broadcloth (#4000, manufactured by Nisshinbo Holdings Inc.). The reaction solution and the ink jet ink composition were applied by the same main scanning, and the treatment solution composition was applied in the same region by another main scanning. Each of the reaction solution and the ink jet ink composition were applied in an amount of each 30 g/m$^2$, and the treatment solution composition was applied in an amount of 15 g/m$^2$. The "solid pattern image" means an image in which dots were uniformly formed on the entire surface of the recording region (main scanning direction×sub-scanning direction: 20 cm×5 cm) so that the application amount of each ink reached the numerical value described in Examples.

After the image was formed, the fabric was left to stand for 3 minutes, heat-treated at 160° C. for 3 minutes in an oven, and dried to prepare a textile-printed matter according to each of Examples and each of Comparative Examples. As the ink jet head, a head unit having a nozzle distance of 600 dpi in the sub-scanning direction, two head chips disposed in the sub-scanning direction, and a nozzle length of 2 inches was used.

3.3 Evaluation Method 3.3.1 Color Development Evaluation

The black optical density (OD value, Status E) of a printed image was measured on a surface of the printed image with respect to the printed matter obtained by the above-mentioned printing method using a colorimeter (FD-7, manufactured by Konica Minolta, Inc.)

Evaluation Standards

AAA: OD value is 1.52 or more.

AA: OD value is 1.50 or more and less than 1.52.

A: OD value is 1.48 or more and less than 1.50.

B: OD value is 1.46 or more and less than 1.48.

C: OD value is less than 1.46.

3.3.2 Bleeding Evaluation

The bleeding at the boundary portion between the printed portion and the non-printed portion of the printed matter obtained by the above-mentioned printing method was visually observed and evaluated according to the following evaluation standards.

Evaluation Standards

A: No bleeding was observed at the boundary portion.

B: Bleeding was slightly observed at the boundary portion.

C: Bleeding was significantly observed at the boundary portion.

3.3.3 Graininess Evaluation

In the above-mentioned printing method, only the application amount of the ink composition was adjusted to produce a printed matter where an image formed with a gradation pattern from white to black with 100% output duty is printed. The printing surface of the obtained printed matter was visually observed to evaluate graininess according to the following standards. A and B were evaluated as a good level.

Evaluation Standards

A: No graininess can be recognized in visual observation at a distance of 30 cm from the printing surface.

B: Graininess can be recognized in visual observation at a distance of 30 cm from the printing surface.

C: Graininess can be recognized in visual observation even at a distance more than 30 cm from the printing surface.

3.3.4 Yellowing Evaluation

In the above-mentioned printing method, only the treatment solution composition in each of Examples was used to record the image on a recording fabric at 30 g/m$^2$ and dried by the above-mentioned printing method to prepare a printed fabric, and L$^+$, a$^+$, and b$^+$ of the surface of the printed image were measured using a colorimeter (FD-7, manufactured by Konica Minolta, Inc.) and used as a sample.

In addition, in the above method, a fabric dried in the oven at 160° C. for 3 minutes without printing by a printer was prepared, and L$^+$, a$^+$, and b$^+$ thereof were measured in the same manner to be used as a reference. With respect to this reference, a color difference ΔE00 (ΔE2000) of the sample was calculated and determined by the following standards.

Evaluation Standards

A: The color difference ΔE00 is 2 or less.

B: The color difference ΔE00 is more than 2.

3.3.5 Discharge Stability Evaluation

The discharge performances of the ink jet ink composition and the treatment solution composition during the production of the printed matter by the above-mentioned printing method were evaluated according to the following standards.

Evaluation Standards

A: No nozzle missing occurs, and the printing surface is evenly and uniformly printed.

B: No nozzle missing occurs, and the printing surface is evenly and uniformly printed, but nozzle missing occurs and head cleaning is required when left for 2 hours.

C: The nozzle missing occurs, and lines where ink is not applied locally are seen on the printing surface.

3.3.6 Surface Tension Stability Evaluation

The reaction solution obtained as mentioned above was left to stand at 60° C. for 1 week. The surface tension of the reaction solution before and after being left to stand was measured by a Wilhelmy method at a solution temperature of 25° C. using a surface tension meter (manufactured by Kyowa Interface Science Co., Ltd., DY-300). Based on the difference in the surface tensions before and after being left to stand, the surface tension stability was evaluated according to the following evaluation standards.

Evaluation Standards

A: The difference in the surface tensions before and after being left to stand was less than 1 mN/m.

B: The difference in the surface tensions before and after being left to stand was 1 mN/m or more and less than 2 mN/m.

C: The difference in the surface tensions before and after being left to stand was 2 mN/m or more.

3.4 Evaluation Results

The evaluation results are illustrated in Tables 1 to 3 (FIGS. 4 to 6).

It was found in the set according to each of Examples that the reduction of the bleeding and the favorable graininess and color developability can be achieved, the set including a treatment solution composition that contains particles containing organopolysiloxane, and water, an ink jet ink composition that contains a pigment and water, and a reaction solution that contains an aggregating agent causing aggregation of a component of the ink jet ink composition, and water, in which a relation between a static surface tension (mN/m) of the reaction solution, a static surface tension (mN/m) of the ink jet ink composition, and a static surface tension (mN/m) of the treatment solution composition satisfies (the static surface tension of the reaction solution)<(the static surface tension of the ink jet ink composition)≤(the static surface tension of the treatment solution composition), the static surface tension of the reaction solution is from 25 to 40 mN/m, and the treatment solution composition, the ink jet ink composition, and the reaction solution are discharged by an ink jet method and used.

On the other hand, in the set according to each of Comparative Examples, which were not as above, the deterioration occurred in at least any of the bleeding, graininess, or color developability.

The following contents are derived from the above-mentioned embodiment.

According to an aspect of the present disclosure, the set includes:

a treatment solution composition that contains particles containing organopolysiloxane, and water;

an ink jet ink composition that contains a pigment and water; and a reaction solution that contains an aggregating agent causing aggregation of a component of the ink jet ink composition, and water, in which a relation between a static surface tension (mN/m) of the reaction solution, a static surface tension (mN/m) of the ink jet ink composition, and a static surface tension (mN/m) of the treatment solution composition satisfies (the static surface tension of the reaction solution)<(the static surface tension of the ink jet ink composition)≤(the static surface tension of the treatment solution composition), the static surface tension of the reaction solution is from 25 to 40 mN/m, and the treatment solution composition, the ink jet ink composition, and the reaction solution are discharged by an ink jet method and used.

In an aspect of the above-mentioned set, the treatment solution composition, the ink jet ink composition, and the reaction solution may be used by deposition to a fabric.

According to any aspect of the above-mentioned set, a viscosity of the ink jet ink composition may be 3 to 10 mPa·s.

According to any aspect of the above-mentioned set, a content of the particles containing organopolysiloxane may be from 5% to 20% by mass with respect to a total amount of the treatment solution composition.

According to any aspect of the above-mentioned set, the organopolysiloxane may be a nonionic silicone.

According to any aspect of the above-mentioned set, the organopolysiloxane may be dimethyl organopolysiloxane.

According to any aspect of the above-mentioned set, the reaction solution may further contain a surfactant having an HLB value of 10 or more.

According to any aspect of the above-mentioned set, the aggregating agent may be a polyvalent metal salt.

According to any aspect of the above-mentioned set, a content of the aggregating agent may be from 0.5% to 10% by mass with respect to a total amount of the reaction solution.

According to any aspect of the above-mentioned set, a content of a coloring material in the treatment solution composition may be 0.1% by mass or less with respect to a total amount of the treatment solution composition.

According to any aspect of the above-mentioned set, a content of the organopolysiloxane may be 90% by mass or more with respect to a total solid content in the treatment solution composition.

According to any aspect of the above-mentioned set, the treatment solution composition may further contain a water-soluble organic solvent having an SP value of 12.5 or less.

According to an aspect of the present disclosure, an ink jet recording method includes an ink deposition step of depositing an ink jet ink composition that contains a pigment and water to a fabric by an ink jet method;

a reaction solution deposition step of depositing a reaction solution that contains an aggregating agent causing aggregation of a component of the ink jet ink composition, and water to the fabric by the ink jet method; and a treatment solution deposition step of depositing a treatment solution composition included in the set according to any one of the above-mentioned aspects to the fabric by the ink jet method after the ink deposition step, in which a relation between a static surface tension (mN/m) of the reaction solution, a static surface tension (mN/m) of the ink jet ink composition, and a static surface tension (mN/m) of the treatment solution composition satisfies (the static surface tension of the reaction solution)<(the static surface tension of the ink jet ink composition)≤(the static surface tension of the treatment solution composition), the static surface tension of the reaction solution is from 25 to 40 mN/m.

According to an aspect of the above-mentioned ink jet recording method, the reaction solution deposition step may be performed simultaneously with the ink deposition step.

The present disclosure is not limited to the above-mentioned embodiments, and various modifications can be made. For example, the present disclosure includes a configuration substantially the same as the configuration described in the embodiments, for example, a configuration having the same function, method, and effect, or a configuration having the same object and effect. The present disclosure also includes configurations in which non-essential parts of the configuration described in the embodiments are replaced. In addition, the present disclosure includes configurations that achieve the same operational effects or configurations that can achieve the same objects as those of the configurations described in the embodiments. The present disclosure also includes configurations in which a known technology is added to the configurations described in the embodiments.

What is claimed is:

1. A set comprising:

a treatment solution composition that contains particles containing organopolysiloxane, and water;

an ink jet ink composition that contains a pigment and water; and a reaction solution that contains an aggregating agent causing aggregation of a component of the ink jet ink composition, and water, wherein a content of the particles containing organopolysiloxane in the treatment solution composition is 7% by mass or more and 20% by mass or less with respect to a total amount of the treatment solution composition, (a static surface tension (mN/m) of the reaction solution) <(a static surface tension (mN/m) of the ink jet ink composition)≤(a static surface tension (mN/m) of the treatment solution composition), the static surface tension of the reaction solution is from 25 to 40 mN/m, and the treatment solution composition, the ink jet ink composition, and the reaction solution are discharged by an ink jet method and used.

2. The set according to claim 1, wherein the treatment solution composition, the ink jet ink composition, and the reaction solution are used by deposition to a fabric.

3. The set according to claim 1, wherein a viscosity of the ink jet ink composition is 3 to 10 mPa·s.

4. The set according to claim 1, wherein the organopolysiloxane is a nonionic silicone.

5. The set according to claim 1, wherein the organopolysiloxane is dimethyl organopolysiloxane.

6. The set according to claim 1, wherein the reaction solution further contains a surfactant having an HLB value of 10 or more.

7. The set according to claim 1, wherein the aggregating agent is a polyvalent metal salt.

8. The set according to claim 1, wherein a content of the aggregating agent is from 0.5% to 10% by mass with respect to a total amount of the reaction solution.

9. The set according to claim 1, wherein a content of a coloring material in the treatment solution composition is 0.1% by mass or less with respect to a total amount of the treatment solution composition.

10. The set according to claim 1, wherein a content of the organopolysiloxane is 90% by mass or more with respect to a total solid content in the treatment solution composition.

11. The set according to claim 1, wherein the treatment solution composition further contains a water-soluble organic solvent having an SP value of 12.5 or less.

12. An ink jet recording method comprising:

an ink deposition step of depositing an ink jet ink composition that contains a pigment and water to a fabric by an ink jet method;

a reaction solution deposition step of depositing a reaction solution that contains an aggregating agent causing aggregation of a component of the ink jet ink composition, and water to the fabric by the ink jet method; and a treatment solution deposition step of depositing a treatment solution composition included in the set according to claim 1 to the fabric by the ink jet method after the ink deposition step, wherein (a static surface tension (mN/m) of the reaction solution) <(a static surface tension (mN/m) of the ink jet ink composition)≤(a static surface tension (mN/m) of the treatment solution composition), and the static surface tension of the reaction solution is from 25 to 40 mN/m.

13. The ink jet recording method according to claim 12, wherein the reaction solution deposition step is performed simultaneously with the ink deposition step.

* * * * *